(12) United States Patent
Asada et al.

(10) Patent No.: US 7,589,934 B2
(45) Date of Patent: Sep. 15, 2009

(54) HYDRODYNAMIC BEARING DEVICE AND DISK ROTATING APPARATUS

(75) Inventors: Takafumi Asada, Osaka-fu (JP); Hiroaki Saito, Ehime-ken (JP); Takao Yoshitsugu, Ehime-ken (JP); Keigo Kusaka, Ehime-ken (JP); Hiroyuki Kiriyama, Ehime-ken (JP); Daisuke Ito, Osaka-fu (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/188,545

(22) Filed: Aug. 8, 2008

(65) Prior Publication Data

US 2008/0304776 A1 Dec. 11, 2008

Related U.S. Application Data

(62) Division of application No. 10/554,473, filed as application No. PCT/JP2004/005277 on Apr. 13, 2004.

(30) Foreign Application Priority Data

Apr. 24, 2003 (JP) ............................. 2003-120025
Jun. 20, 2003 (JP) ............................. 2003-176481

(51) Int. Cl.
*G11B 19/20* (2006.01)
(52) U.S. Cl. .................................. 360/99.08
(58) Field of Classification Search ....................... None
See application file for complete search history.

(56) References Cited

U.S. PATENT DOCUMENTS 5,715,116 A 2/1998 Moritan et al.
5,822,846 A 10/1998 Moritan et al.
2003/0039416 A1 2/2003 Hino
2003/0161558 A1 8/2003 Kishi

FOREIGN PATENT DOCUMENTS

| CN | 1363022 | 8/2002 |
|---|---|---|
| EP | 0479540 | 4/1992 |
| JP | 06-269142 | 9/1994 |

(Continued)

*Primary Examiner*—Mark Blouin
(74) *Attorney, Agent, or Firm*—Harness, Dickey & Pierce, PLC

(57) ABSTRACT

In a hydrodynamic bearing device in which a radial bearing face having a dynamic pressure generating groove on a shaft or an inner periphery of a sleeve is provided and a clearance between the shaft and the sleeve is filled with lubricant, an annular depression is provided on one end face of the sleeve adjacent to a rotor hub and a cover plate for covering the depression is attached to the sleeve so as to define a reservoir for the lubricant or air for the purpose of preventing such a risk that absence of an oil film occurs in clearances of a bearing of the hydrodynamic bearing device due to outflow of oil upon forcing of the oil by air received into the bearing. A step portion is provided on the other end face of the sleeve such that the step portion and the reservoir are communicated with each other by a communication hole. During operation of the hydrodynamic bearing device, air in the hydrodynamic bearing device reaches the reservoir via the communication hole so as to be discharged from the reservoir.

9 Claims, 19 Drawing Sheets

FOREIGN PATENT DOCUMENTS

| | | |
|---|---|---|
| JP | 11-311253 | 11/1999 |
| JP | 2002-021844 | 1/2002 |
| JP | 2002-101610 | 4/2002 |
| JP | 2002-349549 | 12/2002 |
| JP | 2003-120025 | 4/2003 |
| JP | 2003-247547 | 9/2003 |
| JP | 8-331796 | 8/2008 |

HYDRODYNAMIC BEARING DEVICE AND DISK ROTATING APPARATUS

CROSS-REFERENCE TO RELATED APPLICATIONS

This application is a divisional of U.S. patent application Ser. No. 10/554,473 filed on May 26, 2006, which is a national stage of International Application No. PCT/JP2004/005277 filed Apr. 13, 2004. This application claims the benefit and priority of JP 2003-120025 filed Apr. 24, 2003 and JP 2003-176481 filed Jun. 20, 2003. The entire disclosure of each of the above applications are incorporated herein by reference.

BACKGROUND ART

In recent rotational recording apparatuses employing a magnetic disk, etc., data-transfer velocity is rising upon increase of their storage capacity. Hence, since a disk rotating apparatus employed in such recording apparatuses requires high-speed and high precision rotations, a hydrodynamic bearing device is used in a rotary main shaft portion of the disk rotating apparatus.

Hereinafter, a conventional hydrodynamic bearing device is described with reference to FIGS. 18 and 19. In FIG. 18, a shaft 31 is rotatably inserted into a bearing bore 32A of a sleeve 32 mounted on a base 35. In FIG. 18, the shaft 31 has a flange 33 formed integrally at its lower end portion. The flange is received in a step portion 32K of the sleeve 32 so as to rotatably confront a thrust plate 34. A rotor hub 36 to which a rotor magnet 38 is secured to is attached to the shaft 31. A plurality of disk 39 held by a spacer 40 and a clamper 41 are mounted on the rotor hub 36. A motor stator 37 confronting the rotor magnet 38 is mounted on the base 35. Dynamic pressure generating grooves 32B and 32C are provided on an inner peripheral surface of the bearing bore 32A of the sleeve 32. Dynamic pressure generating grooves 33A are provided on one face of the flange 33, which confronts the step portion 32K of the sleeve 32, while dynamic pressure generating grooves 33B are provided on the other face of the flange 33, which confronts the thrust plate 34. Clearances between the shaft 31 and the flange 33 on one hand and the sleeve 32 on the other hand, which include the dynamic pressure generating grooves 32B, 32C, 33A and 33B, are filled with oil 42. One or more vent holes 32E are provided on the sleeve 32 substantially in parallel with an axis of the sleeve 32. A lower end of the vent holes 32E communicates with a space which is disposed at a lower end portion of the sleeve 32 so as to contain the flange 33. An upper end of the vent holes 32E opens to an upper end face of the sleeve 32.

Operation of the conventional hydrodynamic bearing device of the above described arrangement is described by referring to FIGS. 18 and 19. In FIG. 18, if the motor stator 37 is energized, a rotary magnetic field is generated and thus, the rotor magnet 38, the rotor hub 36, the shaft 31 and the flange 33 start rotations. At this time, a pumping pressure is generated in the oil 42 by the dynamic pressure generating grooves 32B, 32C, 33A and 33B. Thus, the shaft 31 is raised and is rotated without coming into contact with the thrust plate 34 and the inner peripheral surface of the bearing bore 32A while being lubricated by the oil 42. A magnetic head (not shown) is brought into contact with the disks 39 so as to perform recording and reproduction of electrical signals.

The above conventional hydrodynamic bearing device has the following problems. FIG. 19 is a fragmentary sectional view including the shaft 31 and the sleeve 32 of FIG. 18. As shown in FIG. 19, the shaft 31 is rotated in the bearing bore 32A of the sleeve 32 while being lubricated by the oil 42. When the hydrodynamic bearing device has been assembled or while the hydrodynamic bearing device is being transported, air lumps or air bubbles (hereinafter, referred to as "air 43A or 43B") may penetrate into the oil 42 in the bearing bore 32A. For example, in case ambient pressure has changed during transport in an aircraft, penetration of air bubbles may happen. If volume of the air 43A penetrating into the vicinity of the dynamic pressure generating grooves 32B and 32c is expanded by rise of temperature or drop of atmospheric pressure, a portion of the dynamic pressure generating grooves 32b is covered by air, thereby resulting in absence of the oil film. Meanwhile, a portion of the oil may leak out of the hydrodynamic bearing device as indicated by oil 42B. Meanwhile, if the air 43B penetrating into the vicinity of the flange 33 is expanded, the hatched oil 42A in the vent hole 32E may be pushed upwardly by expanded air 43C so as to leak out of the hydrodynamic bearing device as shown by oil 42D. If the oil 42 leaks outwardly, shortage of quantity of the oil in the bearing occurs. As a result, there is a risk of extreme aggravation of reliability due to contact of the shaft 31 with the sleeve 32 during rotation.

Meanwhile, also in case a drop impact load (acceleration) is applied to the conventional hydrodynamic bearing device in the direction of the arrow G1 as shown in FIG. 19, there is a risk that the oil 42 leaks outwardly as shown by the oil 42B.

DISCLOSURE OF INVENTION

The present invention has for its object to provide a hydrodynamic bearing device which is highly reliable by preventing lubricant such as oil filled in the hydrodynamic bearing device from leaking out of a bearing, and a disk rotating apparatus including the hydrodynamic bearing device.

A hydrodynamic bearing device of the present invention includes a sleeve having a bearing bore into which a shaft is rotatably inserted and a cover plate which is provided such that a reservoir for storing lubricant and air is defined in the vicinity of one end portion of the bearing bore. A substantially disklike flange is secured to one end portion of the shaft and has one face confronting one end face of the sleeve in the vicinity of the other end portion of the bearing bore. A thrust plate is provided so as to confront the other face of the flange and seal a region including the one end face of the sleeve. A communication path is formed for establishing communication between the reservoir and the region. First and second dynamic pressure generating grooves of a herringbone pattern are arranged in a direction along an axis of the shaft on at least one of an inner peripheral surface of the bearing bore of the sleeve and an outer peripheral surface of the shaft. A third dynamic pressure generating groove of a herringbone pattern is provided on at least one of opposed faces of the flange and the thrust plate and a fourth dynamic pressure generating groove of a herringbone pattern is provided on at least one of the one face of the flange and the one end face of the sleeve. Clearances between the shaft and the sleeve and between the flange and the thrust plate including the first, second, third and fourth dynamic pressure generating grooves are filled with lubricant. One of the sleeve and the shaft is mounted on a stationary base and the other of the sleeve and the shaft is mounted on a rotary member.

In the present invention, the reservoir and the covered region are communicated with each other by the communication path. Thus, the lubricant filled in the clearance between the shaft and the bearing bore of the sleeve is circulated by way of the communication path during operation of the hydrodynamic bearing device. By circulation of the lubricant, air such as air bubbles mixed into the lubricant is also circulated together with the lubricant. When the air bubbles contained in the lubricant have reached the reservoir during the circulation, the air bubbles are separated from the lubricant and are discharged outwardly. Since the reservoir is covered by the cover plate, the lubricant does not leak outwardly. Since the air in the lubricant is automatically removed during operation of the hydrodynamic bearing device in this way, air mixed into the lubricant during assembly of the hydrodynamic bearing device is also removed gradually and thus, only the lubricant is left in the hydrodynamic bearing device. The lubricant flows into the clearance between the shaft and the sleeve from the reservoir but does not leak outwardly. Hence, shortage of the lubricant or absence of the oil film does not occur between the shaft and the sleeve and thus, the hydrodynamic bearing device operates stably. Accordingly, the hydrodynamic bearing device having high long-term reliability can be materialized.

A hydrodynamic bearing device in another aspect of the present invention includes a shaft which has, at its one end portion, a thrust bearing face perpendicular to an axis of the shaft and a sleeve having a bearing bore into which the shaft is rotatably inserted such that the bearing bore acts as a radial bearing. A cover plate is provided such that a reservoir for storing lubricant and air is defined in the vicinity of one end portion of the bearing bore. A thrust plate is provided so as to seal the other end portion of the bearing bore and confront the thrust bearing face of the shaft. A communication path is formed for establishing communication between the reservoir and a region of the other end portion of the bearing bore. First and second dynamic pressure generating grooves of a herringbone pattern are arranged in a direction along the axis of the shaft on at least one of an inner peripheral surface of the bearing bore of the sleeve and an outer peripheral surface of the shaft. A third dynamic pressure generating groove of a herringbone pattern is provided on at least one of the thrust bearing face and one face of the thrust plate confronting the thrust bearing face. Clearances between the shaft and the sleeve and between the thrust bearing face and the thrust plate including the first, second and third dynamic pressure generating grooves are filled with lubricant. One of the sleeve and the shaft is mounted on a stationary base and the other of the sleeve and the shaft is mounted on a rotary member.

In the present invention, the reservoir and the covered region are communicated with each other by the communication path. Thus, the lubricant filled in the clearance between the shaft and the bearing bore of the sleeve is circulated by way of the communication path during operation of the hydrodynamic bearing device. By circulation of the lubricant, air such as air bubbles mixed into the lubricant is also circulated together with the lubricant. When the air bubbles contained in the lubricant have reached the reservoir during the circulation, the air bubbles are separated from the lubricant and are discharged outwardly. Since the air in the lubricant is automatically removed during operation of the hydrodynamic bearing device in this way, air mixed into the lubricant during assembly of the hydrodynamic bearing device is also removed gradually and thus, only the lubricant is left in the hydrodynamic bearing device. The lubricant flows into the clearance between the shaft and the sleeve from the reservoir but does not leak outwardly. Hence, shortage of the lubricant or absence of the oil film does not occur between the shaft and the sleeve and thus, the hydrodynamic bearing device operates stably. Accordingly, the hydrodynamic bearing device having high long-term reliability can be materialized.

In the present invention, since the third dynamic pressure generating groove is provided on the thrust bearing face of the shaft so as to form a thrust bearing portion, the construction is simplified without the need for provision of the flange.

BEST MODE FOR CARRYING OUT THE INVENTION

Hereinafter, preferred embodiments of a hydrodynamic bearing device and a disk rotating apparatus having the hydrodynamic bearing device in the present invention are described with reference to FIGS. 1 to 17.

First Embodiment

Figure 1:
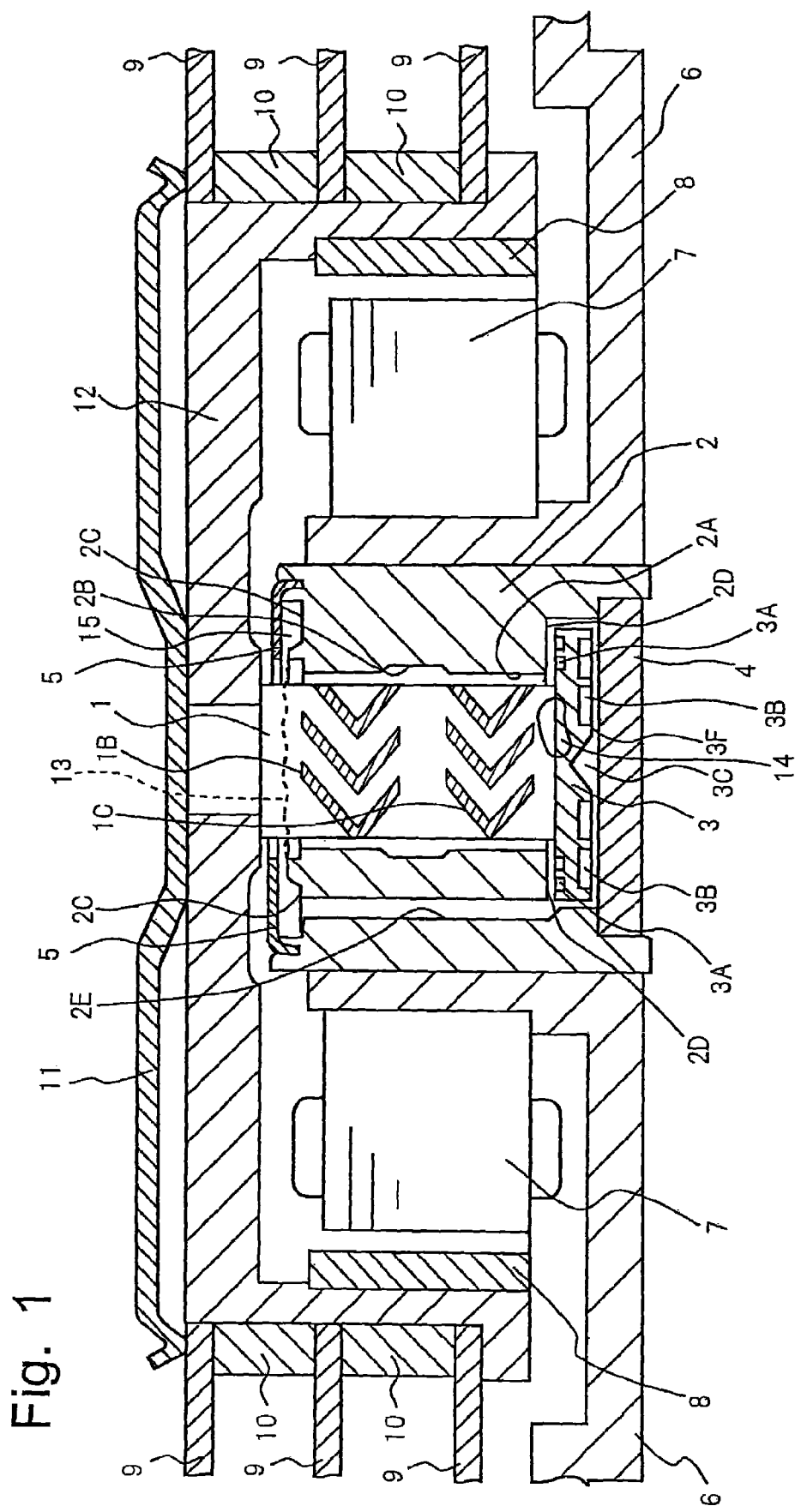
FIG. 1 is a sectional view of a hydrodynamic bearing device according to a first embodiment of the present invention.
Figure 2:
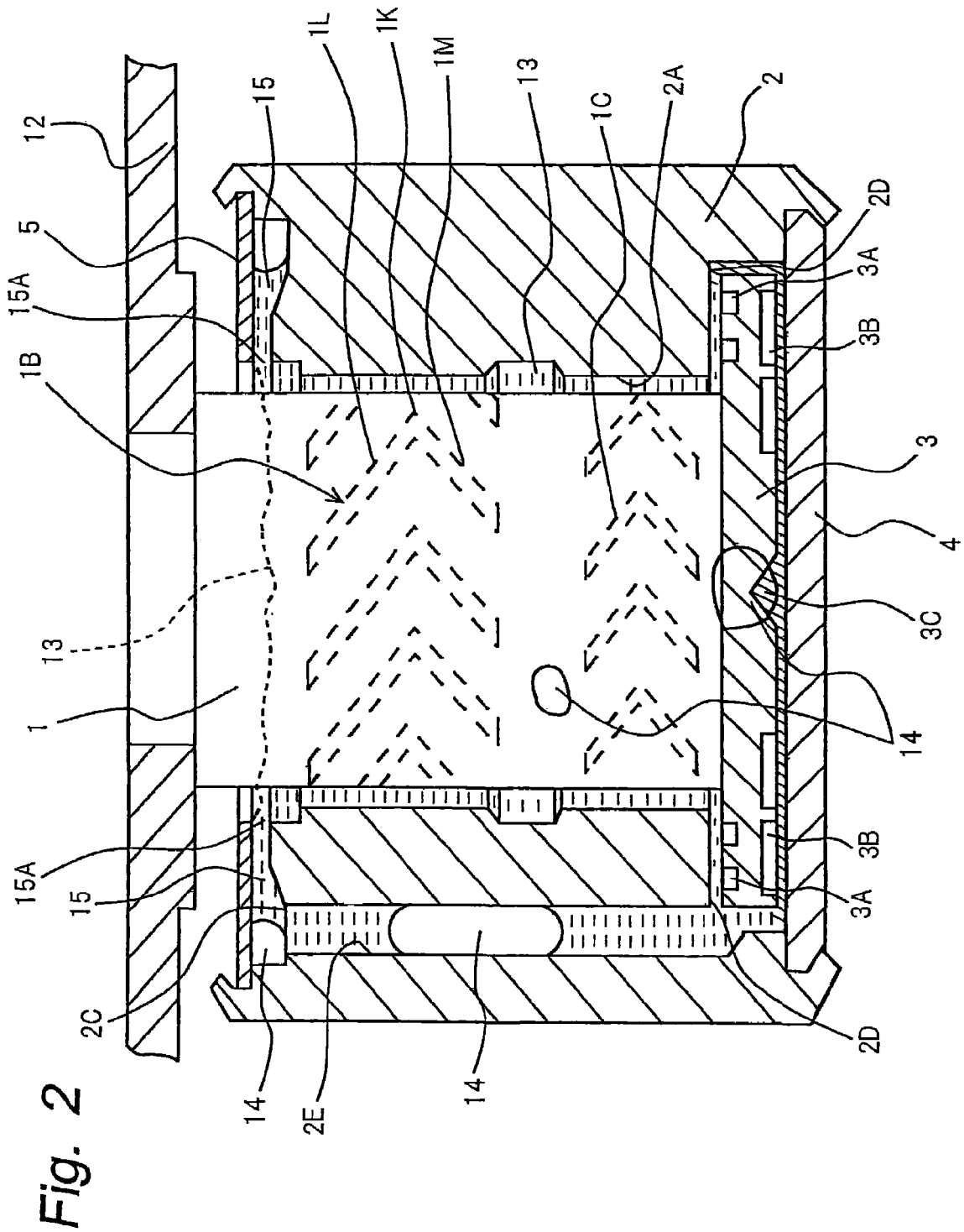
FIG. 2 is an enlarged fragmentary sectional view showing a shaft and a sleeve of the hydrodynamic bearing device of the first embodiment of the first embodiment.

A hydrodynamic bearing device according to a first embodiment of the present invention is described with reference to FIGS. 1 to 7. FIG. 1 is a sectional view of the hydrodynamic bearing device of the first embodiment of the present invention, while FIG. 2 is an enlarged fragmentary sectional view showing a shaft 1 and a sleeve 2. In FIG. 1, the sleeve 2 has a bearing bore 2A and the cylindrical shaft 1 is rotatably inserted into the bearing bore 2A. There is a minute clearance between an outer peripheral surface of the shaft 1 and an inner peripheral surface of the bearing bore 2A of the sleeve 2. Dynamic pressure generating grooves 1B and 1C of a known herringbone pattern in which each groove is bent at an angular portion are formed on at least one of the outer peripheral surface of the shaft 1 and the inner peripheral surface of the bearing bore 2A of the sleeve 2 so as to act as a radial bearing portion. The radial bearing portion supports the shaft 1 in a radial direction of the shaft 1. In the example of FIG. 1, the dynamic pressure generating grooves 1B and 1C are formed on the inner peripheral surface of the bearing bore 2A. Each of the dynamic pressure generating grooves 1B and 1C has the herringbone pattern. In FIG. 1, at least one of the dynamic pressure generating grooves 1B and 1C (the dynamic pressure generating grooves 1B in the example of FIG. 1) are formed such that a length of a lower groove 1M from an angular portion 1K is smaller than that of an upper groove 1L from the angular portion 1K as shown in FIG. 2.

In FIG. 1, a rotor hub 12 having a rotor magnet 8 is mounted on an upper end of the shaft 1. A flange 3 having faces orthogonal to an axis of the shaft 1 and a diameter larger than that of the shaft 1 is integrally formed at a lower end of the shaft 1. A thrust bearing face 3F disposed at the lower face of the flange 3 confronts a thrust plate 4 fixed to the sleeve 2. The thrust plate 4 seals an end portion region of the thrust bore 2A of the sleeve 2, which includes the flange 3. Dynamic pressure generating grooves 3B of a helical shape or a herringbone pattern are formed on one of a lower face of the flange 3 and an upper face of the thrust plate 4 (the lower face of the flange 3 in FIG. 1) so as to act as a thrust bearing portion.

Dynamic pressure generating grooves 3A are formed on one of an outer peripheral portion of an upper face of the flange 3 and a step portion 2D of the sleeve 2, which confronts the outer peripheral portion of the upper face of the flange 3 (the upper face of the flange 3 in FIG. 1). A known large clearance portion 2B is formed at an axially intermediate portion of the bearing bore 2A of the sleeve 2 but is not relevant to the present invention directly, so that its description is abbreviated. The flange 3 is received in the step portion 2D of the sleeve 2. A clearance or a recess 3C for storing oil is provided on the lower face of the flange 3.

An annular upper depression 2C surrounding the bearing bore 2A is provided on an upper end face of the sleeve 2. A ringlike cover plate 5 is attached to the sleeve 2 so as to cover the upper depression 2C. An outer peripheral portion of the cover plate 5 is secured to an outer peripheral portion of the sleeve 2 by caulking or the like. An inner peripheral portion of the cover plate 5 is mounted so as to hold a small clearance with an upper end portion of the bearing bore 2A of the sleeve 2 as will be described later in detail. A space or a clearance defined by the upper depression 2C and the cover plate 5 is referred to as an upper reservoir 15. Oil is stored in the upper reservoir 15 as necessary. In the upper reservoir 15, dimension of the clearance interposed between the cover plate 5 and the sleeve 2 is not constant in the radial direction. Namely, the dimension is made sufficiently small at the opening 15A confronting the outer peripheral surface of the shaft 1, i.e., at an inner peripheral portion of the upper reservoir 15 and is made large at an outer peripheral portion of the upper reservoir 15.

A first communication hole 2E extending substantially in parallel with an axis of the bearing bore 2A is provided on the sleeve 2. The first communication hole 2E communicates, at its upper end, with the upper reservoir 15 and communicates, at its lower end, with a space including the step portion 2D of the sleeve 2 so as to form a communication path. The sleeve 2 is secured to a base 6 on which a motor stator 7 is mounted. A gap between the shaft 1 and the bearing bore 2A of the sleeve 2 including a clearance between the shaft 1 and the sleeve 2 and a clearance between the flange 3 and the thrust plate 4 is filled with lubricant (hereinafter, referred to as "oil") 13. Since the oil 13 has a certain viscosity, air bubbles 14 may penetrate in between the shaft 1 and the bearing bore 2A as shown in FIG. 2. The oil enters also the first communication hole 2E and the upper reservoir 15 but a small amount of air (air bubbles) 14 are present in the first communication hole 2E and the upper reservoir 15. As shown in FIG. 1, a plurality of disks 9 are mounted on the rotor hub 12 by a spacer 10 and a clamper 11 such that a disk rotating apparatus is constituted.

Operation of the hydrodynamic bearing device of the above described arrangement is described with reference to FIGS. 1 to 7, hereinafter. In FIG. 1, if the motor stator 7 is energized from a power source (not shown), a rotary magnetic field is generated and thus, the rotor hub 12 on which the rotor magnet 7 is mounted starts rotation together with the shaft 1, the flange 3, the disks 9, the clamper 11 and the spacer 10. If the rotation is started, the dynamic pressure generating grooves 1B, 1C, 3A and 3B collect the oil 13 to predetermined locations so as to generate a known pumping pressure. Hence, the shaft 1 is raised and is rotated at high speed without coming into contact with the sleeve 2 and the thrust plate 4. FIG. 2 shows a state in which the air 14 mixes into the oil 13 during rotation of the hydrodynamic bearing device.

Figure 3:
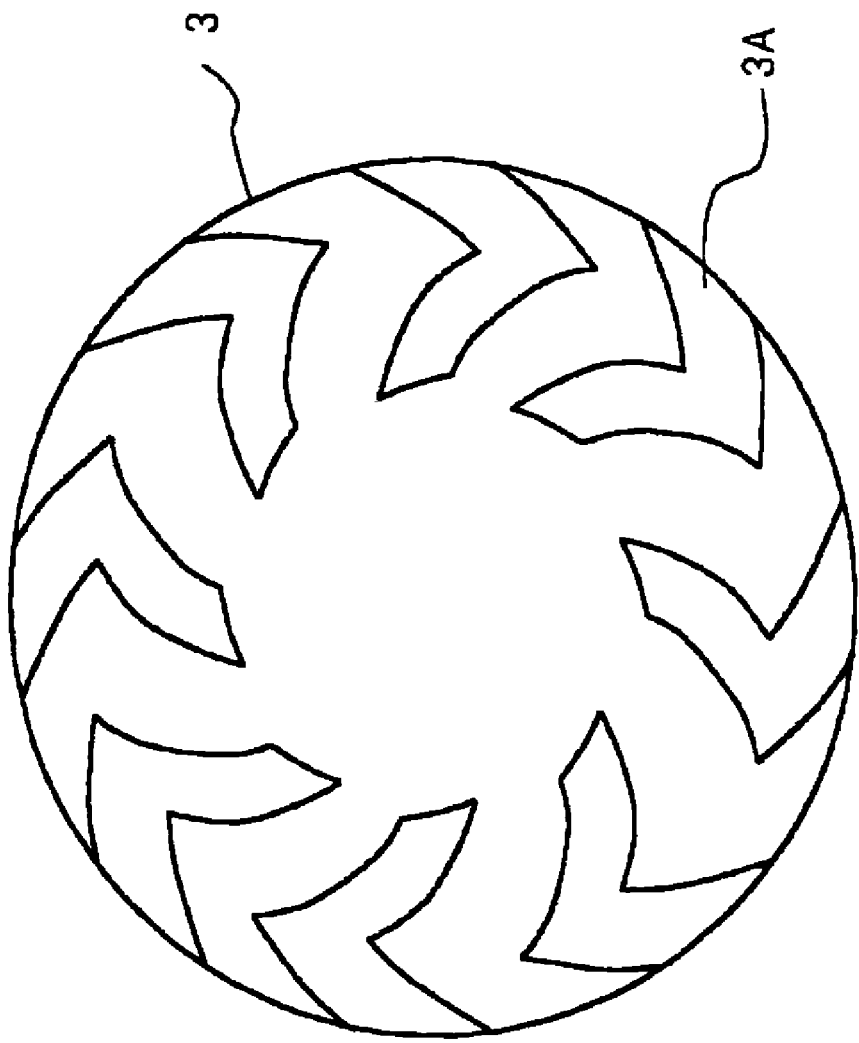
FIG. 3 is a top plan view of a flange 3 of the hydrodynamic bearing device of the first embodiment of the present invention.
Figure 4:
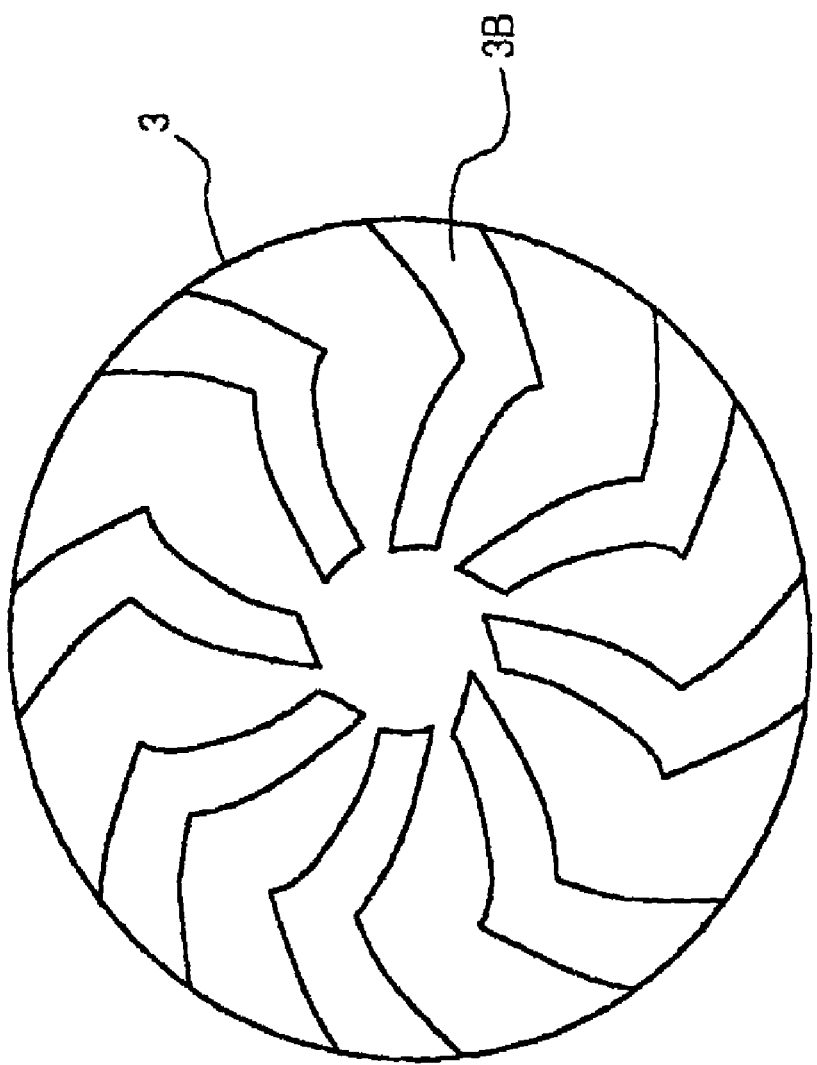
FIG. 4 is a bottom plan view of the flange 3 of the hydrodynamic bearing device of the first embodiment of the present invention.

FIG. 3 is a top plan view showing an example of the known dynamic pressure generating grooves 3A provided on the upper face of the flange 3, which confront the step portion 2D of the sleeve 2. FIG. 4 is a top plan view showing an example of the known dynamic pressure generating grooves 3B provided on the lower face of the flange 3. The radially bent dynamic pressure generating grooves 3A and 3B shown in FIGS. 3 and 4 collect the oil 13 so as to generate a thrust force parallel to the axis of the shaft 1.

Figure 5:
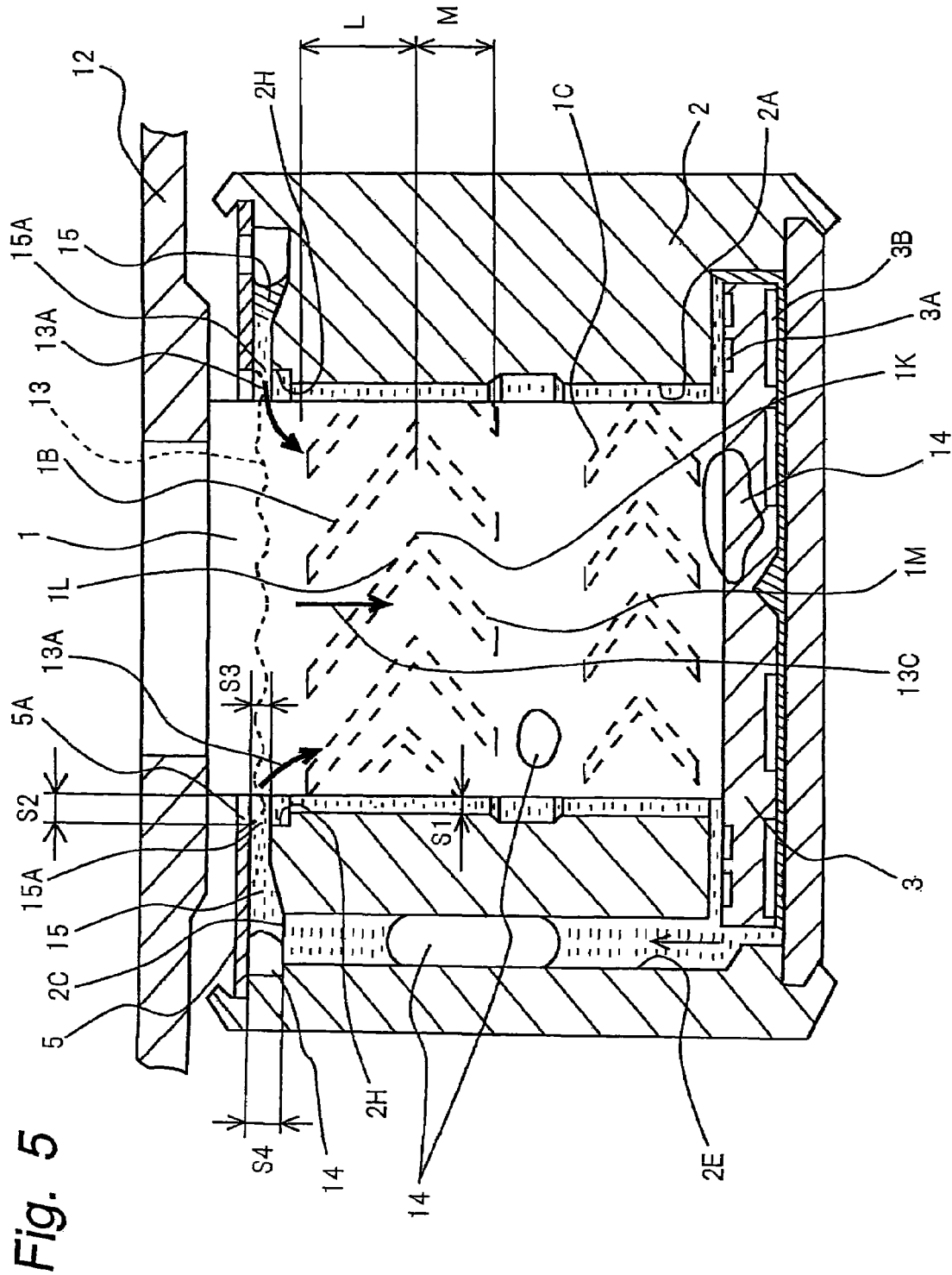
FIG. 5 is a fragmentary sectional view showing an operation of the hydrodynamic bearing device of the first embodiment of the present invention including the shaft and the sleeve.

FIG. 5 is an enlarged fragmentary sectional view showing the shaft 1 and the sleeve 2 of the hydrodynamic bearing device of this embodiment. In FIG. 5, "S1" denotes a dimension of a radial clearance of the dynamic pressure generating grooves 1B and "S2" denotes a dimension of a radial clearance between the outer periphery of the shaft 1 and the cover plate 5. An upper end portion 2H of the bearing bore 2A of the sleeve 2 has a diameter larger than that of the bearing bore 2A. The "dimension of the radial clearance" is defined as a dimension of a clearance between the outer periphery of the shaft 1 and the inner periphery of the bearing bore 2A at the time the axis of the shaft 1 is held in alignment with a central axis of the bearing bore 2A of the sleeve 2. "S3" denotes a dimension of the clearance 15A of a portion of the upper reservoir 15 confronting the shaft 1, i.e., an inner peripheral portion. "S4" denotes a dimension of a clearance at an outer peripheral portion of the upper reservoir 15. In this embodiment, the dimensions S1 and S2 of the radial clearances and the dimensions S3 and S4 of the clearances are set so as to have the following relations.

S1<S2, S1<S3 and S3<S4

By setting the clearances as described above, the oil 13 stored in the upper reservoir 15 moves, by its surface tension, to the neighborhood of the opening 15A of the clearance dimension S3 smaller than the clearance dimension S4. From the opening 15A of the clearance dimension S3, the oil 13 further enters the smaller radial clearance of the dimension S1 between the shaft 1 and the bearing bore 2A so as to flow, as shown by the arrow 13A, to a region of the dynamic pressure generating grooves 1B acting as the radial bearing portion.

In the dynamic pressure generating grooves 1B and 1C of the radial bearing, each of the dynamic pressure generating grooves 1B has an upper groove 1L and a lower groove 1M from an angular portion 1K and a length L of the upper groove 1L is made larger than a length M of the lower groove 1M such that a vertically asymmetric herringbone pattern is formed. Therefore, the oil 13 flowing into the radial clearance of the dimension S2 between the shaft 1 and the upper end portion 2H of the bearing bore 2A is sucked, by pumping action at the time of start of the hydrodynamic bearing device and during rotation of the hydrodynamic bearing device, into the radial bearing between the bearing bore 2A and the shaft 1 including the dynamic pressure generating grooves 1B and 1C. Thus, the oil 13 present in the upper reservoir 15 flows into the radial bearing as shown by the arrow 13A. As a result, in the clearance between the shaft 1 and the bearing bore 2A, the oil 13 flows in a direction indicated by the arrow 13C. Therefore, the oil 13 disposed adjacent to the flange 3 is delivered so as to flow into the communication hole 2E and reaches the upper reservoir 15. Then, the oil 13 again flows from the opening 15A between the cover plate 5 and the sleeve 2 into the radial bearing portion between the shaft 1 and the bearing bore 2A so as to circulate through the hydrodynamic bearing device. By circulation of the oil 13, the air bubbles 14 in the oil 13 also passes through the communication hole 2E together with the oil 13 so as to reach the upper reservoir 15. The air bubbles 14 which have reached the upper reservoir 15 are discharged outwardly from the clearance between the cover plate 5 and the sleeve 2.

Figure 6:
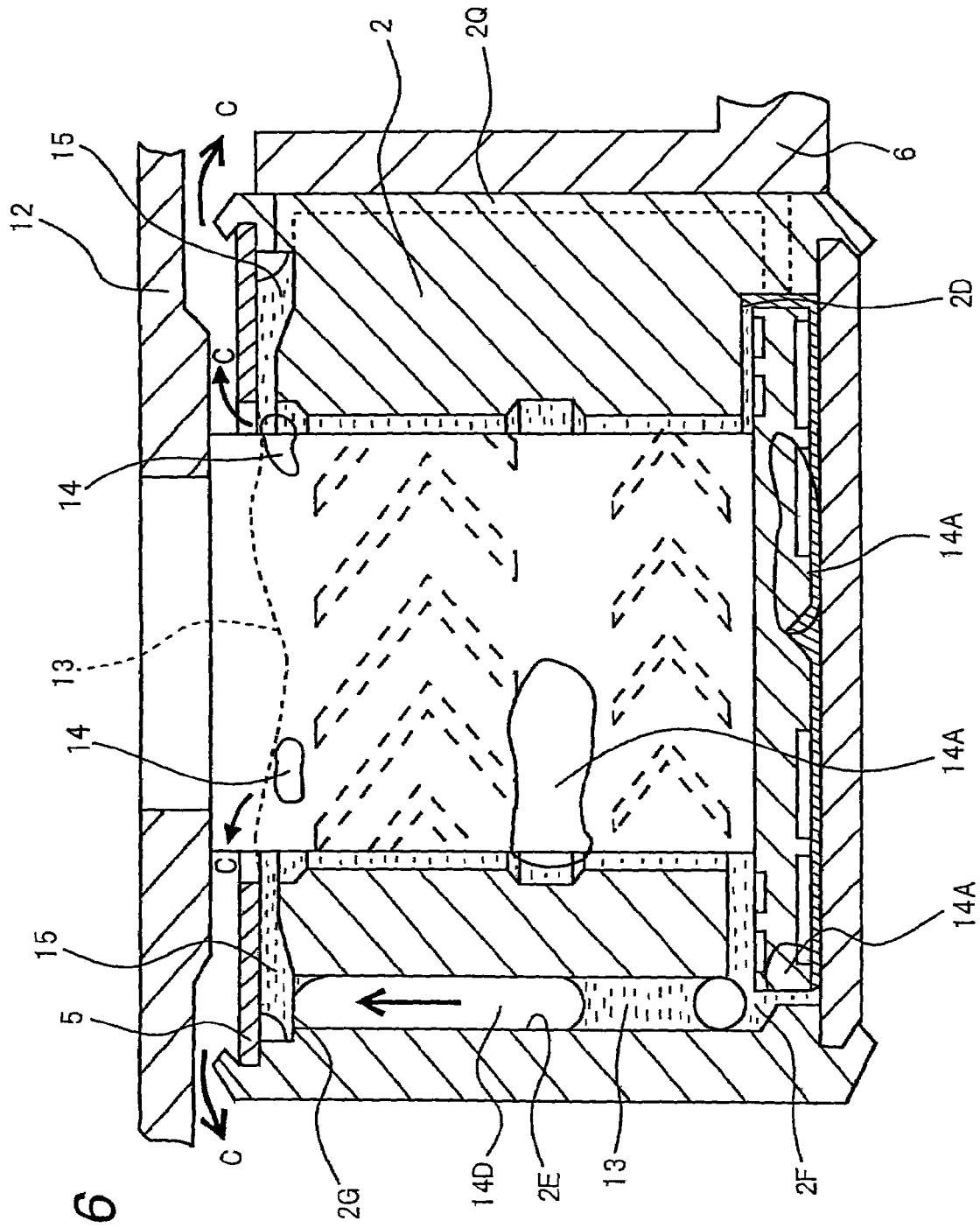
FIG. 6 is a fragmentary sectional view showing a further operation of the hydrodynamic bearing device of the first embodiment of the present invention including the shaft and the sleeve.

Discharge of air is described in more detail with reference to FIG. 6. FIG. 6 is a fragmentary sectional view showing state of air which has entered the oil 13 in the hydrodynamic bearing device. If quantity of air 14A formed by air bubbles or air lumps present in the hydrodynamic bearing device increases, internal pressure of the air 14A rises upon rise of ambient temperature or the air 14A is expanded by drop of atmospheric pressure, volume of the air 14A increases. In such a case, the air 14A enters the first communication hole 2E from a lower inlet 2F of the first communication hole 2E and proceeds upwardly together with the oil 13 as indicated by air 14D. The air 14D which has reached an upper end 2G of the first communication hole 2E enters the upper reservoir 15 and is discharged outwardly from the small clearance between the cover plate 5 and the sleeve 2 as shown by the arrow C. In the first communication hole 2E, the oil 13 also proceeds upwardly together with the air 14D. However, after the oil 13 has been carried to the upper reservoir 15, the oil 13 remains in the upper reservoir 15 due to its surface tension. Thus, only the air 14D is discharged. Therefore, since the oil 13 is neither forced nor leaked out of the hydrodynamic bearing device, such a phenomenon that absence of the oil film is caused by shortage of the oil 13 does not happen, so that the hydrodynamic bearing device is rotated stably.

In a concrete example of the embodiment shown in FIG. 5, the shaft 1 has a diameter of 1 to 20 mm. The clearance dimension S3 ranges from 30 to 150 microns. The dimension S1 of the radial clearance of the radial bearing ranges from 1 to 10 microns. The first communication hole 2E has a diameter of 0.3 to 1.0 mm. Experiments conducted by the present inventors have revealed that if the diameter of the shaft 1, the clearance dimension S3, the dimension S1 of the radial clearance and the diameter of the first communication hole 2E fall in the respective ranges referred to above, the oil 13 is held in the hydrodynamic bearing device without leaking outwardly and only the air 14 is discharged outwardly.

Figure 7:
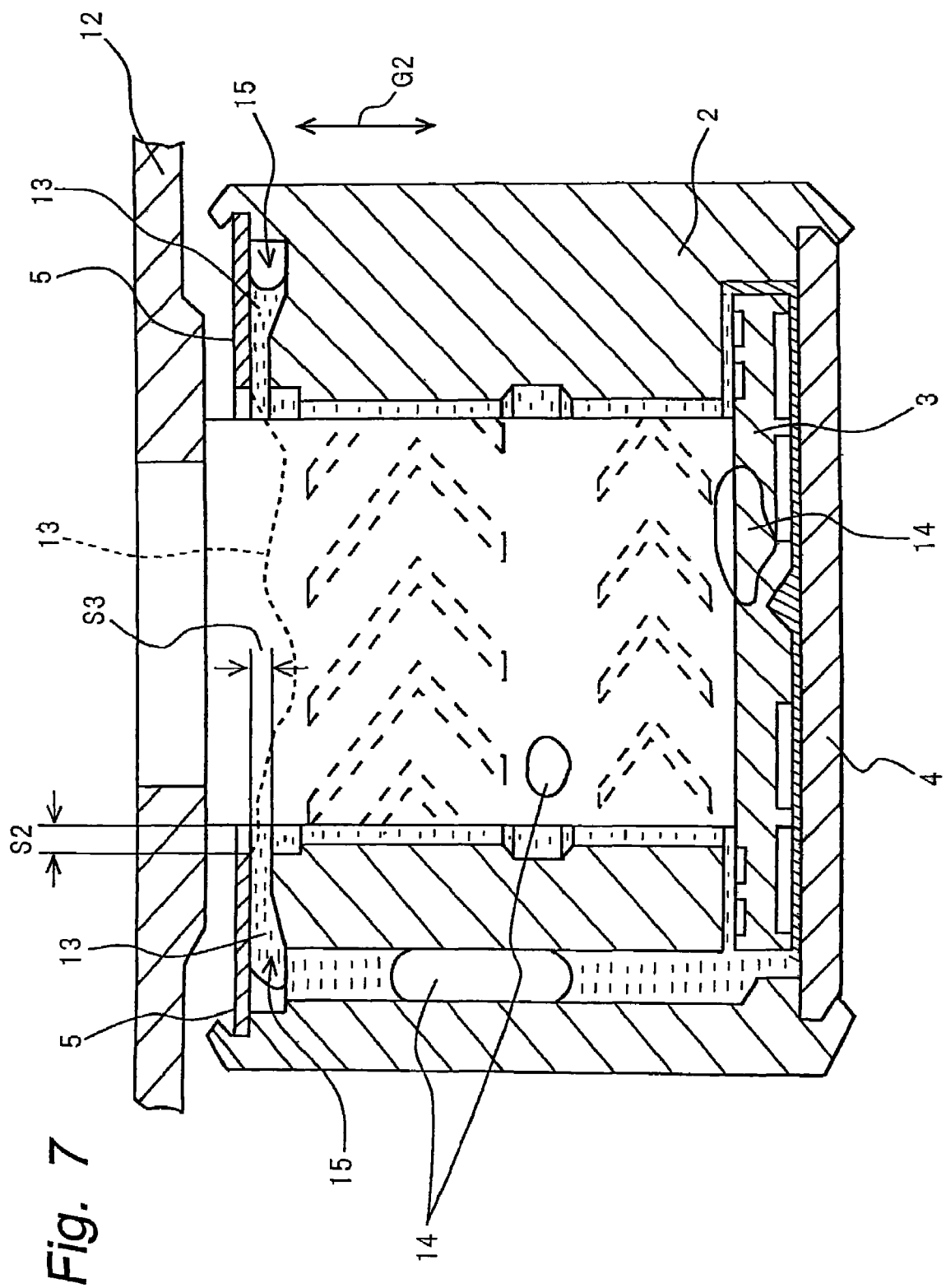
FIG. 7 is a fragmentary sectional view showing a still further operation of the hydrodynamic bearing device of the first embodiment of the present invention including the shaft and the sleeve.

As shown in FIG. 7 which is a fragmentary sectional view similar to FIG. 6, the present inventors have made various tests in which a drop impact load or vibrations are applied in a direction of the arrow G2. The test results have shown that the oil 13 stored in the upper reservoir 15 is held in the upper reservoir 15 due to its surface tension without flowing out of the hydrodynamic bearing device. In the experiments, it has been found that even if an acceleration of 2,500 G is applied to the hydrodynamic bearing device for 1 to 10 msec by setting both of the clearance dimensions S2 and S3 to about 50 microns, the oil 13 does not leak.

In this embodiment, air such as air bubbles, which has entered the oil 13 in the hydrodynamic bearing device, proceeds to the upper reservoir 15 of the sleeve 2 by way of the first communication hole 2E during operation of the hydrodynamic bearing device and is discharged out of the hydrodynamic bearing device therefrom. However, the oil 13 remains in the upper reservoir 15 without leaking outwardly. For example, since air which has entered the oil during manufacture of the hydrodynamic bearing device is also removed during use of the hydrodynamic bearing device, long-term reliability of the hydrodynamic bearing device is upgraded. Meanwhile, the single first communication hole 2E is illustrated in FIG. 1 but a plurality of the first communication holes 2E may be provided on the sleeve 2. As shown by the dotted lines in FIG. 6, a communication hole 2Q for establishing communication between the upper reservoir 15 and space of the step portion 2D may be provided between the outer periphery of the sleeve 2 and the base 6 in place of the first communication hole 2E. In this case, a vertical groove may be provided on the outer periphery of the sleeve 2 as a portion of the communication hole 2Q corresponding to the outer peripheral portion of the sleeve 2.

Second Embodiment

Figure 8:
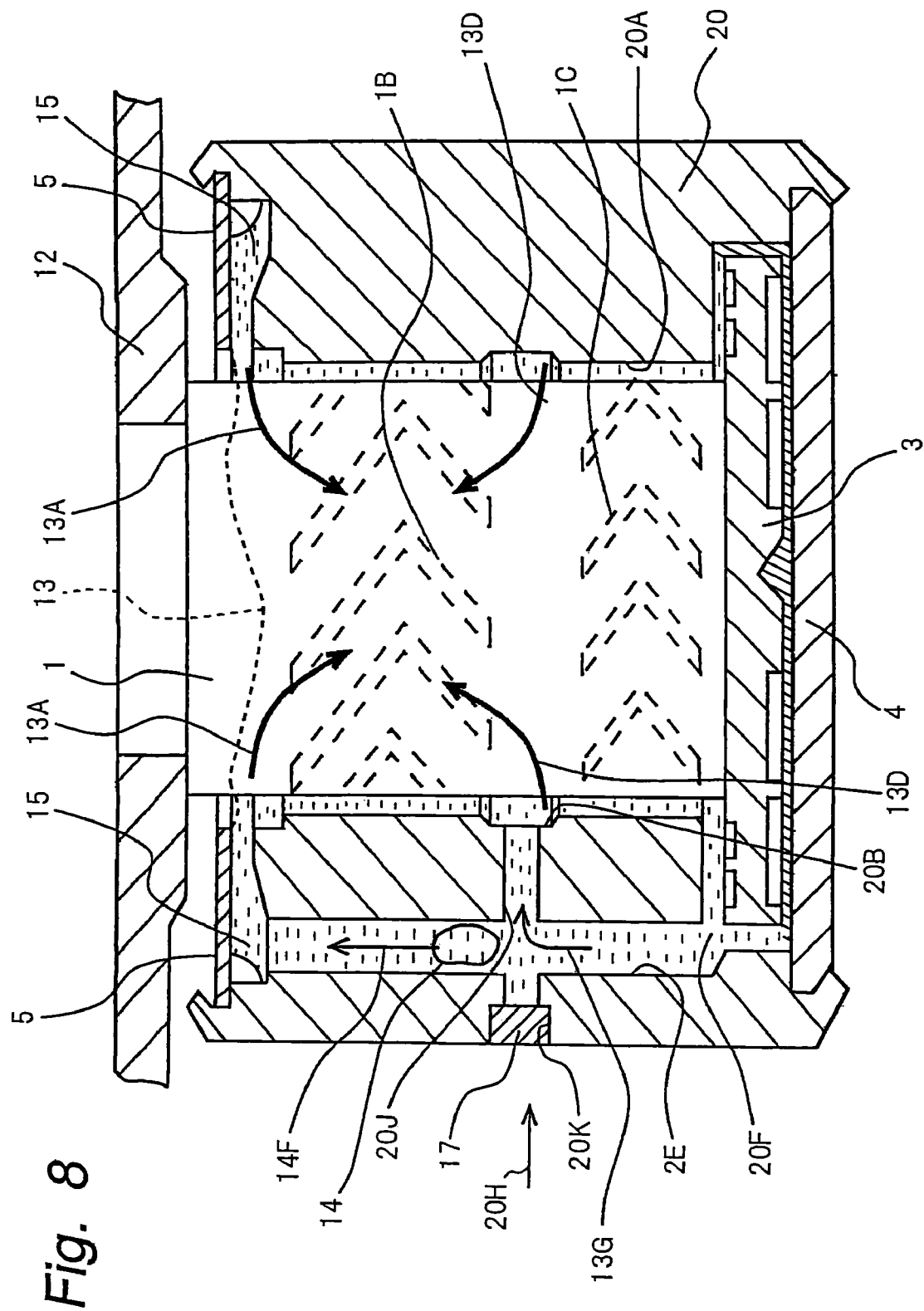
FIG. 8 is a fragmentary sectional view showing a shaft and a sleeve of a hydrodynamic bearing device according to a second embodiment of the present invention.

FIG. 8 is a fragmentary sectional view showing the shaft 1 and a sleeve 20 of a hydrodynamic bearing device according to a second embodiment of the present invention. In FIG. 8, a second communication hole 20J for establishing communication between the first communication hole 2E and a large clearance portion 20B is provided at a central portion of the sleeve 20. Other constructions of this hydrodynamic bearing device are similar to those of the hydrodynamic bearing device of the first embodiment shown in FIG. 1.

In order to form the second communication hole 20J, there is, for example, a method in which as shown in FIG. 8, a hole is formed on the sleeve 20 in a direction of the arrow 20H with a drill. After the hole has been formed on the sleeve 20, a hole 20K on the outer periphery of the sleeve 20 is sealed with a plug 17.

In the hydrodynamic bearing device of this embodiment, the first communication hole 2E communicates with space between the dynamic pressure generating grooves 1B and the dynamic pressure generating grooves 1C via the second communication hole 20J. Thus, the oil 13 flows from the upper reservoir 15 into a portion of the dynamic pressure generating grooves 1B as shown by the arrow 13A and flows also from the second communication hole 20J into the portion of the dynamic pressure generating grooves 1B as shown by the arrow 13D. The oil 13 which has flowed into the portion of the dynamic pressure generating grooves 1B in the direction of the arrow 13D flows together with the oil 13 having flowed into the portion of the dynamic pressure generating grooves 1B in the direction of the arrow 13A and returns from a lower inlet 20F to the first communication hole 2E through a space between the shaft 1 and the bearing bore 20A including the dynamic pressure generating grooves 1B and 1C. Air mixed into the oil 13 is separated from the oil 13 when the oil 13 flows into the second communication hole 20J as shown by the arrow 13G. The separated air 14 proceeds in a direction of the arrow 14F and is discharged outwardly by way of the upper reservoir 15.

In this embodiment, since the oil 13 is displaced vigorously by providing the second communication hole 20J, removal of the air 14 from the oil 13 is performed efficiently. As a result, reliability of the hydrodynamic bearing device is upgraded further. Meanwhile, even if the air 14 has entered the oil 13 in the hydrodynamic bearing device for some reason, the air 14 is discharged out of the hydrodynamic bearing device rapidly, so that reliability of the hydrodynamic bearing device becomes high.

Third Embodiment

Figure 9:
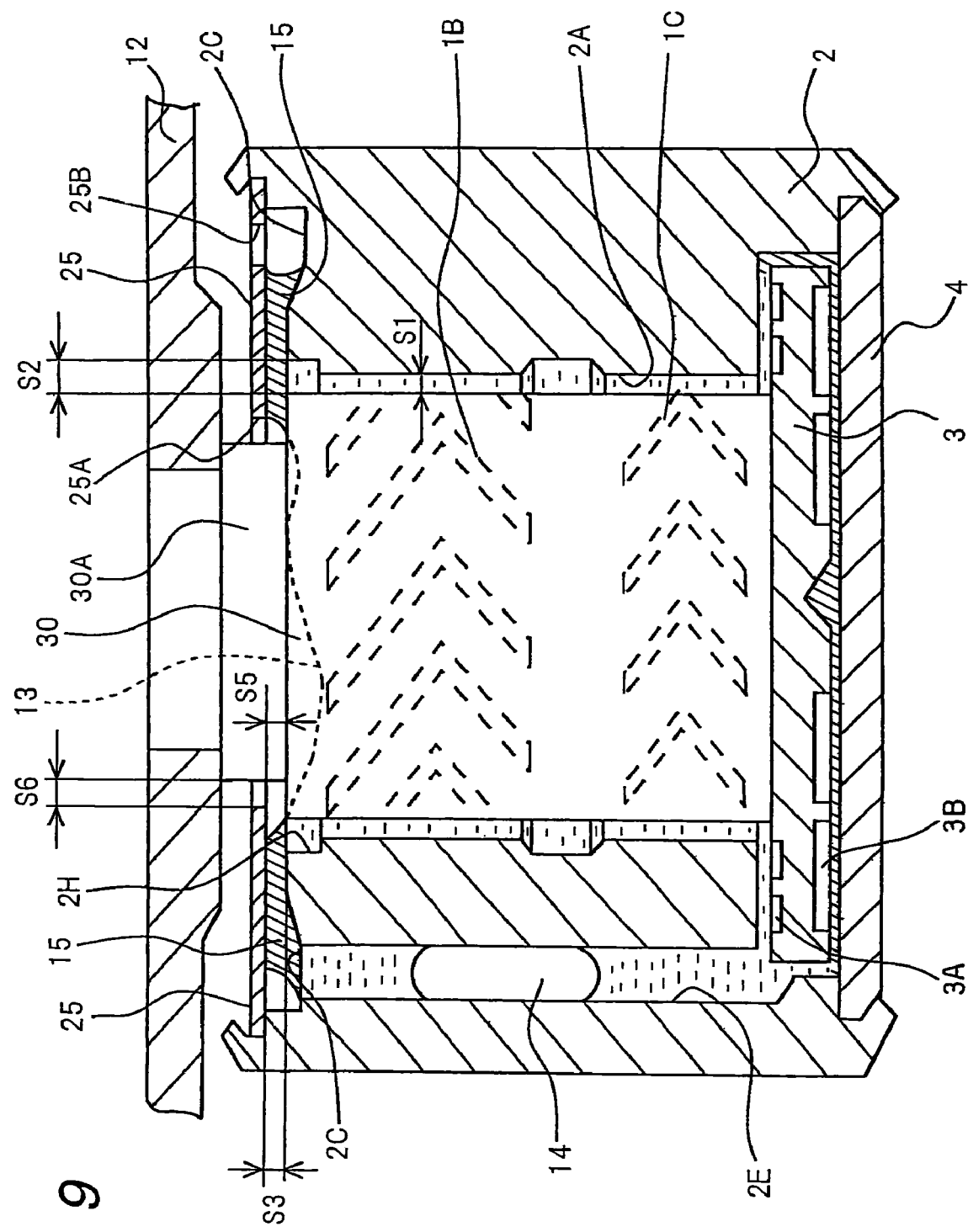
FIG. 9 is a fragmentary sectional view showing a shaft and a sleeve of a hydrodynamic bearing device according to a third embodiment of the present invention.

FIG. 9 is a fragmentary sectional view showing a shaft 30 and the sleeve 2 of a hydrodynamic bearing device according to a third embodiment of the present invention. In FIG. 9, a small diameter portion 30A having a diameter smaller than that of the shaft 30 is provided on the shaft 30 in the vicinity of an end portion of the shaft 30 coupled with the rotor hub 12. A diameter of an inner peripheral edge 25A of a ringlike cover plate 25 is larger than that of the small diameter portion 30A but is smaller than that of the shaft 30. Namely, the cover plate 25 is arranged to cover the clearance between the shaft 30 and the sleeve 2. Other constructions of this hydrodynamic bearing device are similar to those of the first embodiment shown in FIG. 1. By this arrangement, it is possible to further positively prevent outward leakage of the oil 13 from the clearance between the shaft 30 and the cover plate 25. Meanwhile, since the diameter of the inner peripheral edge 25A of the cover plate 25 is smaller than that of the shaft 30, the shaft 30 is not detached from the bearing bore 2A of the sleeve 2. Namely, the cover plate 25 functions to prevent detachment of the shaft 30.

In FIG. 9, it is supposed that "S1" denotes a dimension of a radial clearance in the neighborhood of the dynamic pressure generating grooves 1B and "S2" denotes a dimension of a radial clearance between the shaft 30 and the upper end portion 2H of the sleeve 2. The upper end portion 2H of the bearing bore 2A of the sleeve 2 has a diameter lager than that of the bearing bore 2A. In the upper reservoir 15 defined by the cover plate 25 and the upper depression 2C of the sleeve 2, it is supposed that "S3" denotes a dimension of a clearance of an inner peripheral portion of the upper reservoir 15 and "S5" denotes a dimension of an axial clearance between the cover plate 25 and an upper end of the shaft 30. It is supposed that "S6" denotes a dimension of a radial clearance between the small diameter portion 30A of the shaft 30 and the inner peripheral edge 25A of the cover plate 25. In this embodiment, the dimension S1 is set to be smaller than the dimensions S2, S3, S5 and S6, i.e., S1<S2, S1<S3, S1<S5 and S1<S6. Oil has a property to flow into a smallest clearance by its surface tension. Thus, by setting the dimensions S1, S2, S3, S5 and S6 as described above, the oil 13 stored in the upper reservoir 15 flows into the clearance of the smallest dimension S1 between the shaft 30 and the bearing bore 2A. As a result, since the oil 13 flows to regions of the dynamic pressure generating grooves 1B and 1C sufficiently, absence of the oil film does not occur. Meanwhile, the dimensions S2, S3, S5 and S6 are set such that the dimension S2 is smaller than the dimension S6, the dimension S3 is smaller than the dimension S6 and the dimension S5 is smaller than the dimension S6, i.e., S2<S6, S3<S6 and S5<S6. By setting the dimensions S2, S3, S5 and S6 as described above, the oil 13 does not flow out of the clearance of the largest dimension S6 between the small diameter portion 30A and the inner peripheral edge 25A of the cover plate 25.

In the hydrodynamic bearing device of this embodiment, a ventilation port 25B is provided on the cover plate 25. In a plane containing the cover plate 25, the ventilation port 25B is disposed so as to circumferentially deviate by 180 degrees in FIG. 1 from a mouth of the first communication hole 2E opening to the upper reservoir 15. If the ventilation port 25B is aligned with the mouth of the first communication hole 2E, such an incident may happen that when air rising through the first communication hole 2E is discharged from the ventilation port 25B, the oil 13 is also expelled outwardly. This expulsion of the oil 13 can be prevented by circumferentially shifting the ventilation port 25B and the first communication hole 2E from each other as described above. Air which has flowed out of the upper end of the first communication hole 2E travels circumferentially in the upper reservoir 15 along the cover plate 25 and runs outwardly when the air has reached the ventilation port 25B.

Fourth Embodiment

Figure 10:
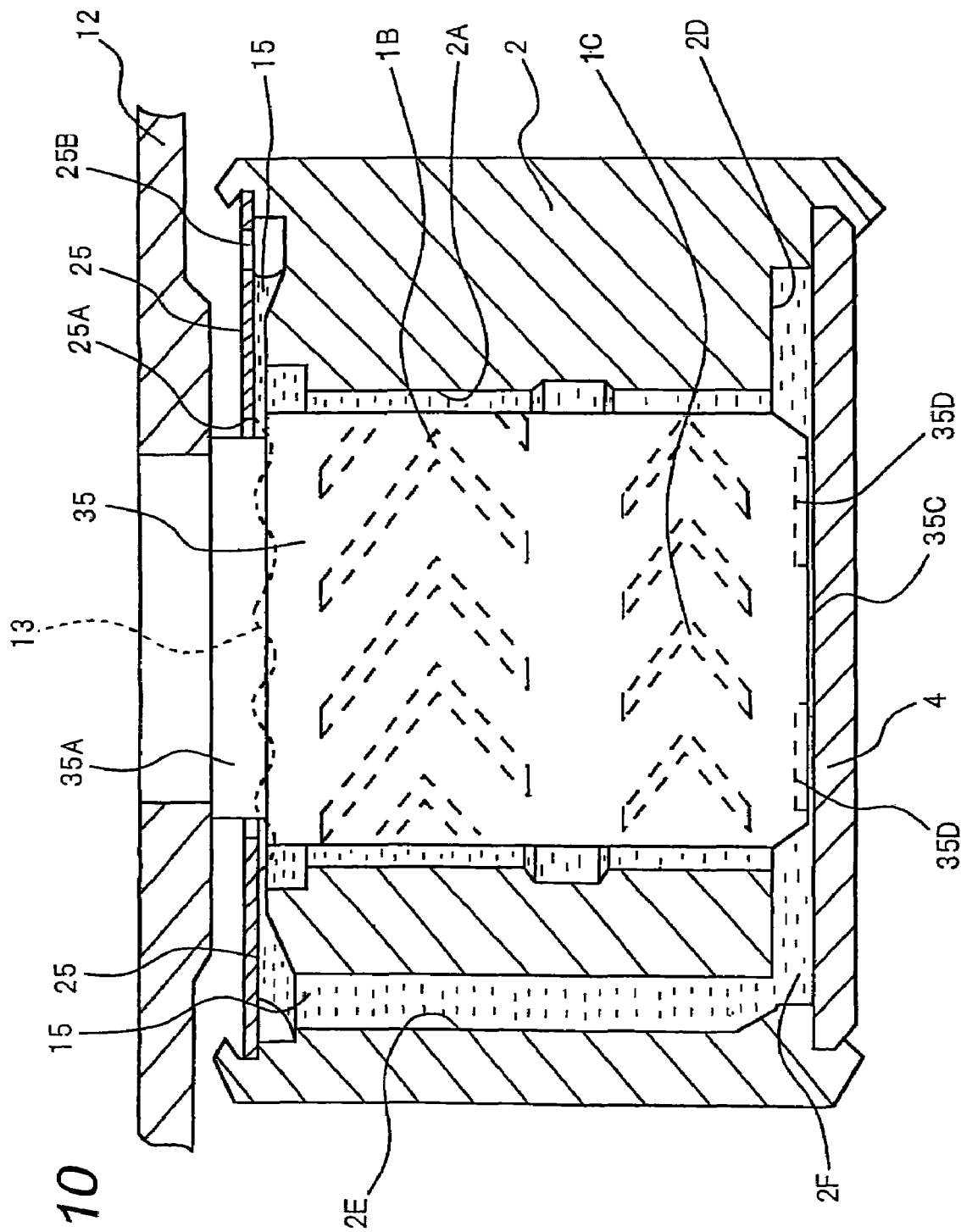
FIG. 10 is a fragmentary sectional view showing a shaft and a sleeve of a hydrodynamic bearing device according to a fourth embodiment of the present invention.

FIG. 10 is a fragmentary sectional view showing a shaft 35 and the sleeve 2 of a hydrodynamic bearing device according to a fourth embodiment of the present invention. In FIG. 10, dynamic pressure generating grooves 35D are formed on a lower end face 35C of the shaft 35. Therefore, the flange 3 of the hydrodynamic bearing device of the third embodiment shown in FIG. 9 is not provided on the shaft 35. Other constructions of this hydrodynamic bearing device are substantially similar to those of the hydrodynamic bearing device of FIG. 9. At an end portion of the shaft 35, on which the rotor hub 12 is mounted, the shaft 35 has a small diameter portion 35A. A diameter of the inner peripheral edge 25A of the cover plate 25 is set to be larger than an outside diameter of the small diameter portion 35A and smaller than an outside diameter of the shaft 35. Namely, the inner peripheral edge 25A of the cover plate 25 is arranged to cover a clearance between the shaft 35 and the bearing bore 2A of the sleeve 2. Thus, it is possible to positively prevent leakage of the oil 13 from the upper clearance between the shaft 35 and the sleeve 2 in FIG. 10.

The dynamic pressure generating grooves 35D which may be formed on one of the lower end face 35C of the shaft 35 and an upper face of the thrust plate 4 are formed on the lower end face 35C of the shaft 35 in FIG. 10 and confront the thrust plate 4 so as to constitute a thrust bearing with the thrust plate 4. In FIG. 10, the step portion 2D is formed on the underside of the sleeve 2. An end portion of the bearing bore 2A including the step portion 2D of the sleeve 2 is sealed by the thrust plate 4. A space between the step portion 2D and the thrust plate 4 communicates with the first communication hole 2E at the lower inlet 2F. The first communication hole 2E acts as a communication path for establishing communication between the step portion 2D and the upper reservoir 15.

In the hydrodynamic bearing device of this embodiment, the dynamic pressure generating grooves 35D are provided on the lower end face 35C of the shaft 35 without providing the flange on the shaft 35. Hence, in comparison with the foregoing embodiments, the construction is simpler and thus, is cheaper.

Also in the hydrodynamic bearing device of this embodiment, dynamic pressure generating grooves 2B and 2C formed by shallow grooves of a herringbone pattern are provided on at least one of the outer peripheral face of the shaft 35 and the inner peripheral surface of the sleeve 2 (on the inner peripheral surface of the sleeve 2 in FIG. 10) and the clearance between the shaft 35 and the sleeve 2 is filled with the oil 13 in the same manner as the foregoing embodiments. The upper reservoir 15 is provided on the sleeve 2 in the vicinity of the upper end face of the sleeve 2 and communicates with a space adjacent to the lower end face 35C of the shaft 35 through the first communication hole 2E. Thus, the oil 13 circulates in a path in which the oil 13 flows from the upper reservoir 15 into the clearance between the shaft 35 and the sleeve 2 and returns from the lower portion of the sleeve 2 to the upper reservoir 15 via the first communication hole 2E. Since air mixed into the oil 13 is discharged outwardly from the ventilation port 25B of the cover plate 25 during operation of the hydrodynamic bearing device, the air in the oil 13 is eliminated and thus, absence of the oil film does not occur in the clearance around the shaft 35. Thus, the hydrodynamic bearing device of this embodiment can preserve high reliability for a long term. Meanwhile, a disk rotating apparatus employing the hydrodynamic bearing device of this embodiment has high long-term reliability.

Also in the hydrodynamic bearing device of this embodiment, since air mixed into the oil 13 is readily discharged outwardly, absence of the oil film, which is apt to happen in the hydrodynamic bearing device, is prevented, so that long service life and high long-term reliability are obtained.

Fifth Embodiment

Figure 11:
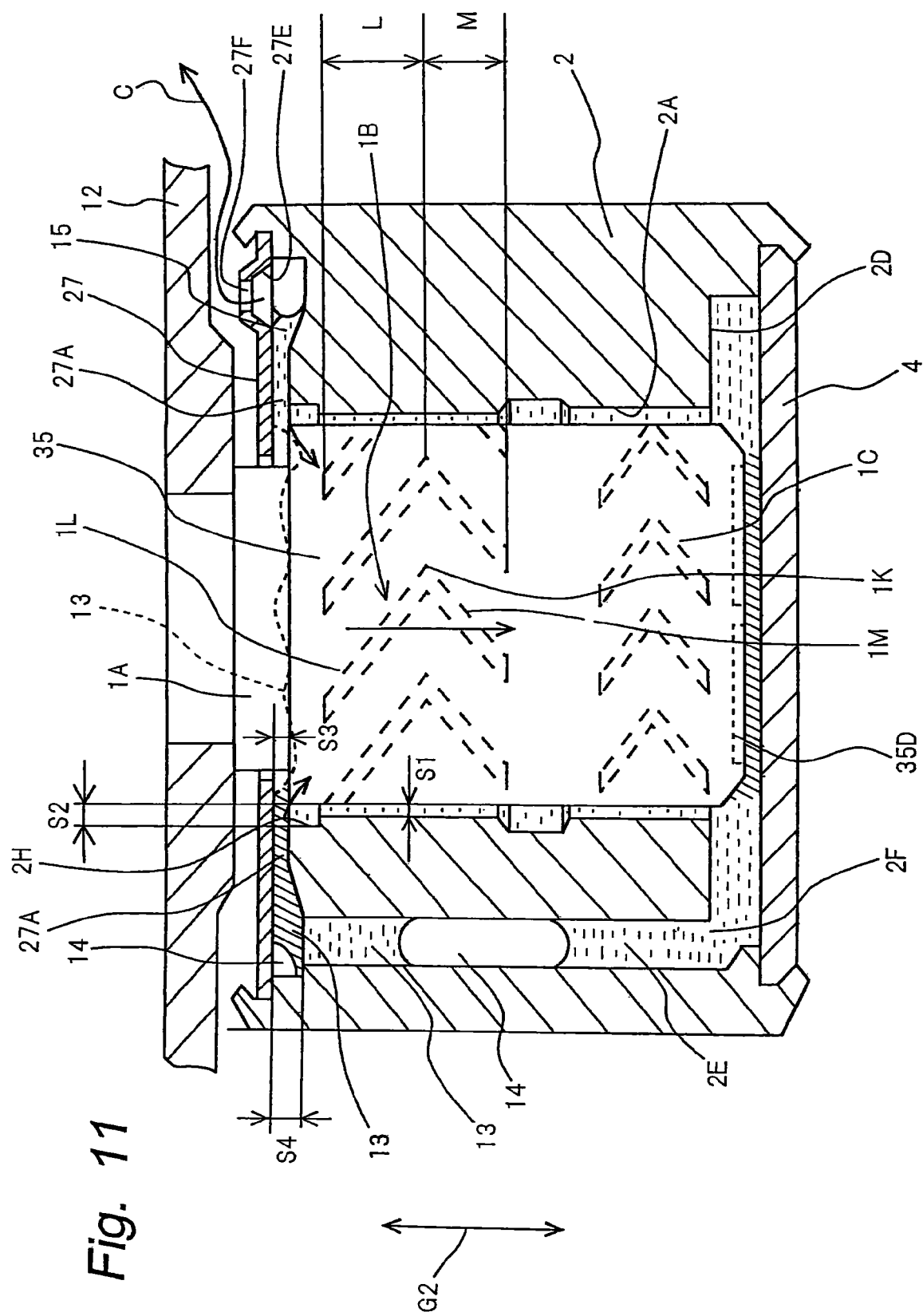
FIG. 11 is a fragmentary sectional view showing a shaft and a sleeve of a hydrodynamic bearing device according to a fifth embodiment of the present invention.

FIG. 11 is a fragmentary sectional view showing the shaft 35 and the sleeve 2 of a hydrodynamic bearing device according to a fifth embodiment of the present invention. In FIG. 11, the hydrodynamic bearing device of this embodiment has a construction similar to that of the hydrodynamic bearing device of the fourth embodiment shown in FIG. 10 except that a cover plate 27 is different from the cover plate 25 of the fourth embodiment.

Figure 12A:
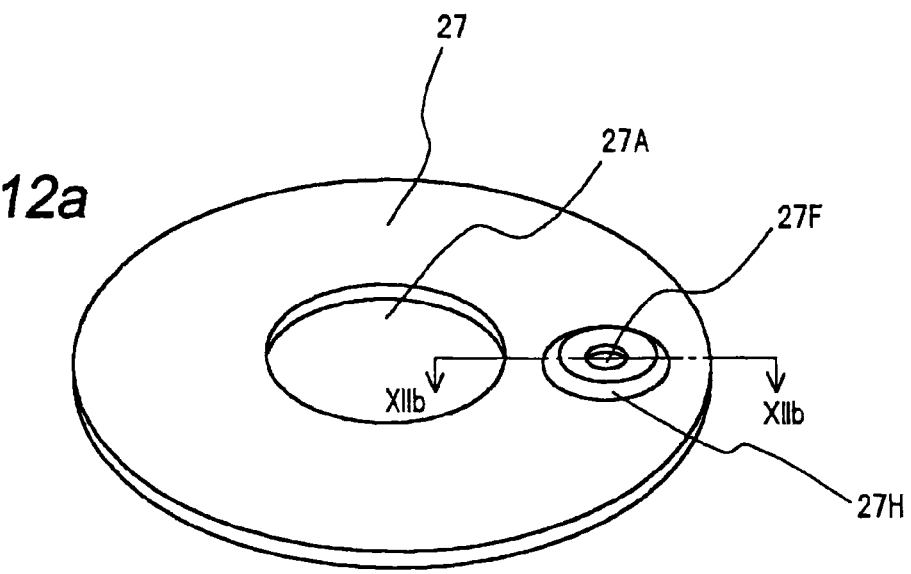
FIG. 12a is a perspective view of a cover plate of the hydrodynamic bearing device of the fifth embodiment of the present invention.
Figure 12B:
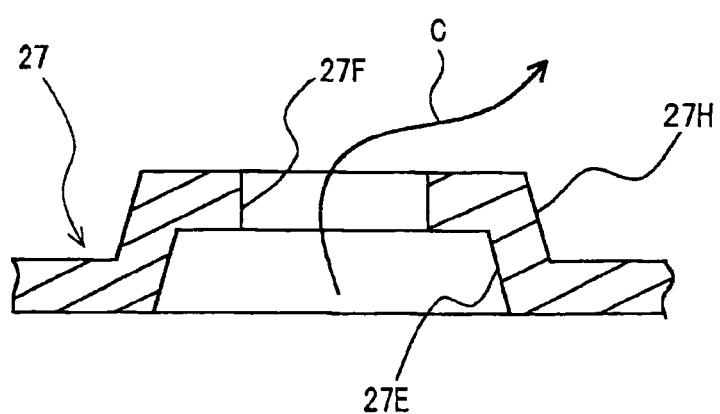
FIG. 12b is a sectional view of the cover plate of the hydrodynamic bearing device of the fifth embodiment of the present invention.

The cover plate 27 of this embodiment is shown in a perspective view of FIG. 12a and a sectional view of FIG. 12b along the line XIIb-XIIb. As shown in FIGS. 12a and 12b, the cover plate 27 has, on its lower face, at least one recess 27E. A boss 27H is formed at a portion of an upper face of the cover plate 27, which portion corresponds to the recess 27E. A ventilation port 27F is provided at a substantially central portion of the recess 27E. The cover plate 27 is attached to the sleeve 2 such that the recess 27E confronts the upper reservoir 15.

In this embodiment, the clearance between the cover plate 27 and the upper reservoir 15 becomes large at the recess 27E of the cover plate 27. The oil 13 in the upper reservoir 15 is least likely to flow into the large clearance below the recess 27E due to its surface tension and thus, remains in a portion of a small clearance surrounding the recess 27E. Hence, since the ventilation port 27F disposed at the central portion of the recess 27E is not covered by the oil 13, air in the upper reservoir 15 is discharged smoothly from the ventilation port 27F.

In the hydrodynamic bearing device of this embodiment, supposing that "S1" denotes a dimension of a radial clearance between the bearing bore 2A of the dynamic pressure generating grooves 1B and the shaft 35, "S2" denotes a dimension of a radial clearance between an outer periphery of the shaft 35 and an inner periphery of the upper end portion 2H of the sleeve 2, "S3" denotes a dimension of a clearance between the cover plate 27 and an end portion of the shaft 35 and "S4" denotes a dimension of a clearance at an outer peripheral portion of the upper reservoir 15, the dimensions S2 and S3 are set to be larger than the dimension S1, i.e., S1<S2 and S1<S3. Meanwhile, the dimension S4 is set to be larger than the dimension S3, i.e., S4>S3. As a result, the oil 13 in the upper reservoir 15 gathers to a vicinity of an opening 27A having the clearance of the small dimension S3 due to its surface tension and then, flows into the clearance (radial bearing portion) having the smaller dimension S1 between the shaft 35 and the bearing bore 2A.

Each of the dynamic pressure generating grooves 1B has the upper groove 1L and the lower groove 1M, which have the dimensions L and M from the angular portion 1K such that the upper groove 1L is larger than the lower groove 1M. Hence, the oil 13 which has flowed into the clearance of the dimension S2 between the upper end portion 2H of the sleeve 2 and the shaft 35 is drawn into the radial clearance of the dimension S1 between the shaft 35 and the bearing bore 2A of the sleeve 2 by pumping action of the dynamic pressure generating grooves 1B at the time of start of operation of the hydrodynamic bearing device and during operation of the hydrodynamic bearing device. By this action, the oil 13 in the upper reservoir 15 is caused to flow into the radial bearing positively.

Air in the form of minute air bubbles is mixed into the lubricant such as the oil 13 filled in the clearance between the sleeve 2 and the shaft 35. If quantity of the air mixed into the oil 13 is large, the air bubbles are expanded by rise of internal pressure of the air bubbles upon rise of ambient temperature or the air bubbles are expanded in an environment of low pressure, volume of the air increases. The air whose volume has increased enters the first communication hole 2E from the lower inlet 2F of the first communication hole 2E as indicated by air 14. In FIG. 11, the air 14 proceeds further upwardly so as to enter the upper reservoir 15. The air 14 which has entered the upper reservoir 15 travels circumferentially and is discharged outwardly from the ventilation port 27F as shown by the arrow C when the air 14 has reached the recess 27E. At this time, the oil 13 is also displaced together with the air 14 in the first communication hole 2E. However, since the oil 13 which has been carried to the upper reservoir 15 is separated from the air 14, only the oil 13 remains in the upper reservoir 15 due to its surface tension, while the air 14 is discharged from the ventilation port 27F as shown by the arrow C. Hence, the oil 13 is neither forced nor leaked out of the hydrodynamic bearing device. Therefore, the hydrodynamic bearing device can be rotated stably without being subjected to absence of the oil film.

In this embodiment, the shaft 35 has a diameter of 1 to 20 mm and the dimension S3 of the clearance ranges from 30 to 150 microns. The dimension S1 of the radial clearance of the radial bearing ranges from 1 to 10 microns and the first communication hole 2E has a diameter of 0.3 to 1.0 mm. In the hydrodynamic bearing device having the dimensions set in the above ranges, it has been confirmed that the oil 13 is satisfactorily held in the respective clearances of the hydrodynamic bearing device and the air 14 is discharged favorably.

In FIG. 11, even if a drop impact load or vibrations are applied in a direction of the arrow G2, the oil 13 stored in the upper reservoir 15 is held in the upper reservoir 15 due to its surface tension without flowing outwardly.

Experiments conducted by the present inventor have revealed that even if an acceleration of 2,500 G is applied for 1 to 10 msec by setting the dimensions S2 and S3 to about 50 microns, the oil 13 does not leak and rotation of the hydrodynamic bearing device can be continued by holding the shaft 35 and the sleeve 3 out of contact with each other.

Sixth Embodiment

Figure 13:
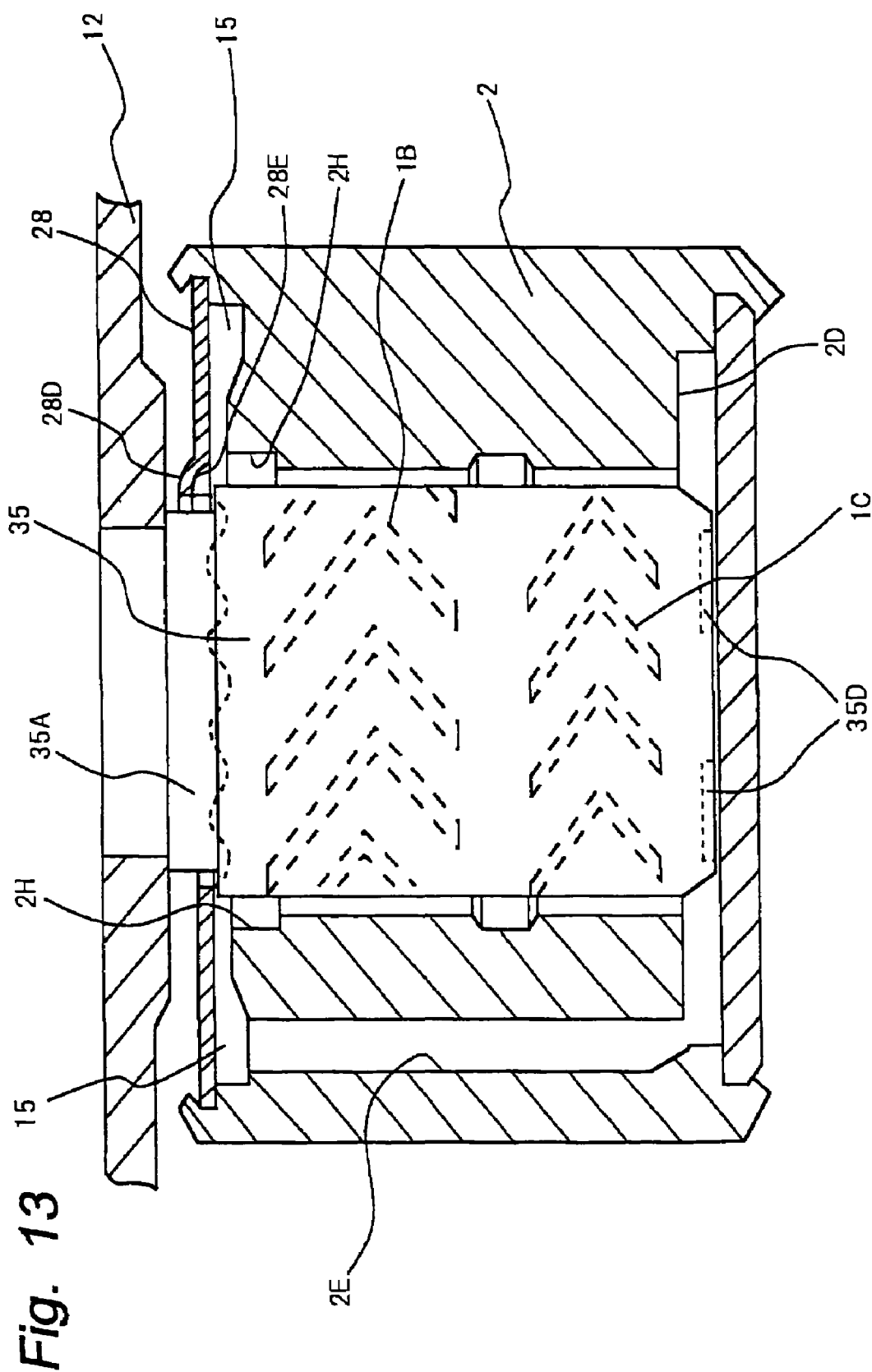
FIG. 13 is a fragmentary sectional view showing a shaft and a sleeve of a hydrodynamic bearing device according to a sixth embodiment of the present invention.
Figure 14A:
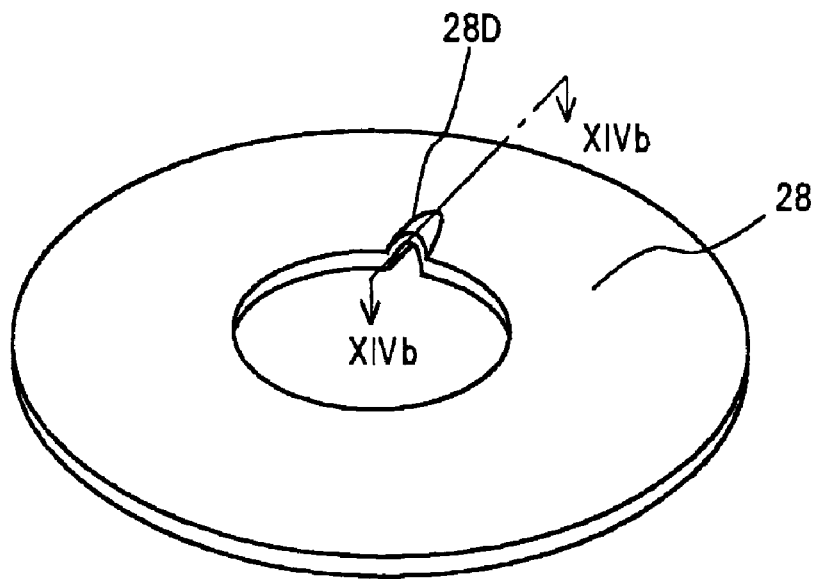
FIG. 14a is a perspective view of a cover plate of the hydrodynamic bearing device of the sixth embodiment of the present invention.
Figure 14B:
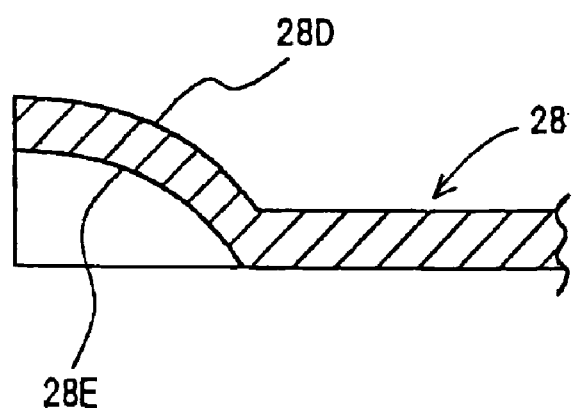
FIG. 14b is a sectional view of the cover plate of the hydrodynamic bearing device of the sixth embodiment of the present invention.

FIG. 13 is a fragmentary sectional view showing the shaft 35 and the sleeve 2 of a hydrodynamic bearing device according to a sixth embodiment of the present invention. In this embodiment, a cover plate 28 is different from the cover plate 27 of the hydrodynamic bearing device of the fifth embodiment shown in FIG. 12. Other constructions of this hydrodynamic bearing device are similar to those shown in FIG. 1. As shown in a perspective view of FIG. 14a and a sectional view of FIG. 14b, the cover plate 28 of this embodiment is formed with a bulge portion 28D by partially bulging an inner peripheral portion of the ringlike cover plate 28. A recess 28E is formed on one face of the cover plate 28 opposite to the bulge portion 28D. The cover plate 28 is attached to the sleeve 2 such that the recess 28E confronts the upper end portion 2H on the end face of the sleeve 2. In an area in which the recess 28E and the end face of the sleeve 2 confront each other, clearance between the recess 28E and the end face of the sleeve 2 increases by a size of the recess 28E. Thus, the oil 13 does not gather to a vicinity of the recess 28E due to its surface tension. Therefore, air which has reached the upper reservoir 15 by way of the first communication hole 2E travels in the annular upper reservoir 15 circumferentially and is smoothly discharged from the recess 28E when the air has reached the recess 28E. Since the oil 13 proceeds to the small clearance due to its surface tension and does not gather to a vicinity of the recess 28E having the large clearance, leakage of the oil 13 out of the recess 28E does not occur.

In this embodiment, the recess 28E can be formed by such a simple working in which the inner peripheral portion of the cover plate 28 is recessed.

Figure 15:
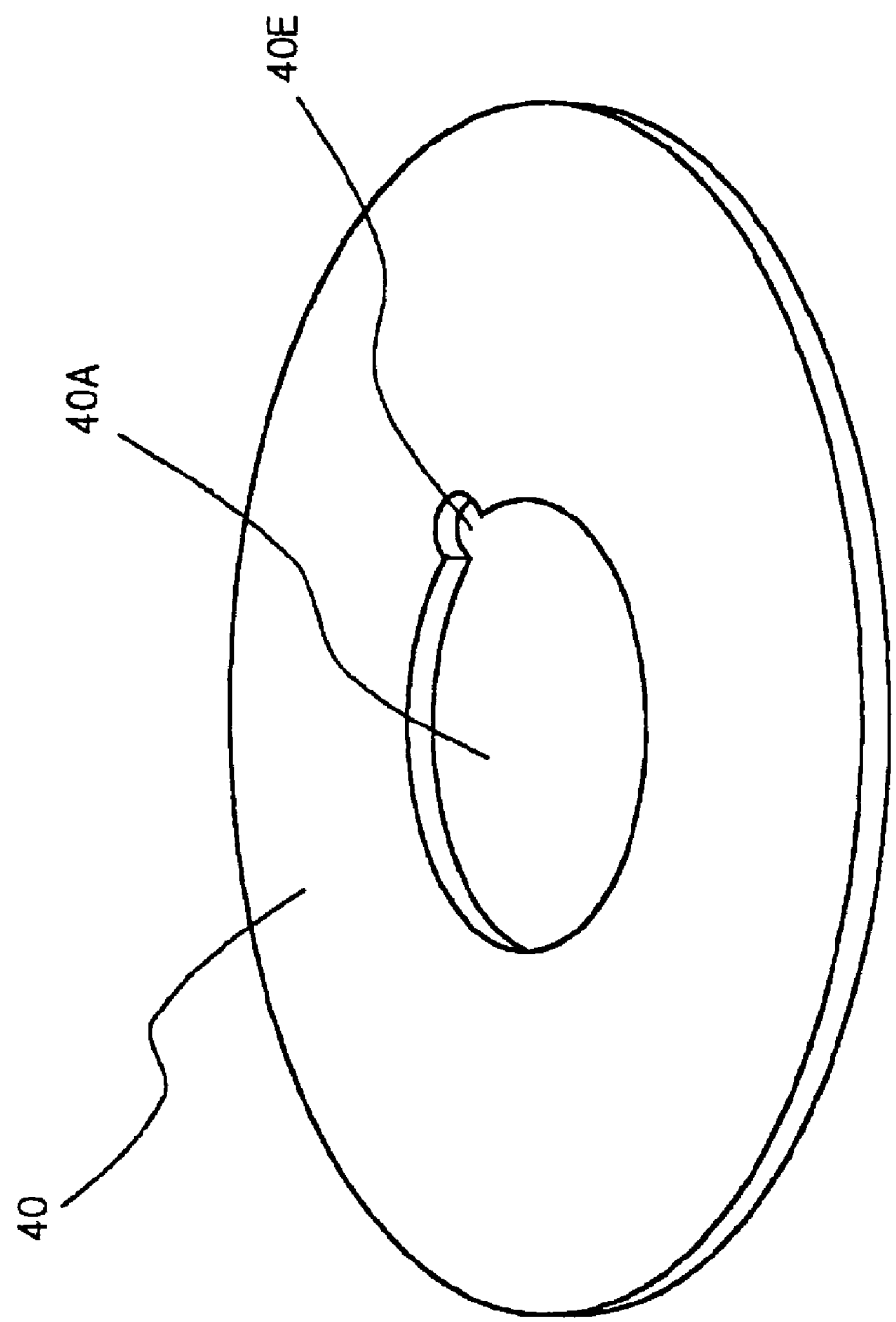
FIG. 15 is a perspective view of a further cover plate of the hydrodynamic bearing device of the sixth embodiment of the present invention.

FIG. 15 is a perspective view showing a cover plate 40 as another example of the cover plate 28 of the hydrodynamic bearing device of this embodiment. Other constructions than the cover plate 40 are similar to those of FIG. 13. In FIG. 15, the ringlike cover plate 40 is formed, at its inner peripheral portion, with a notch 40E. Since a part of the upper end portion 2H of the inner peripheral portion of the sleeve 2 is connected to an outside by the notch 40E, air is discharged smoothly through the notch 40E. The notch 40E can be formed by performing simple working, for example, simultaneously with press working of the cover plate 40. Since the notch 40E can be worked easily, manufacturing cost of the cover plate 40 is also reduced.

Seventh Embodiment

Figure 16:
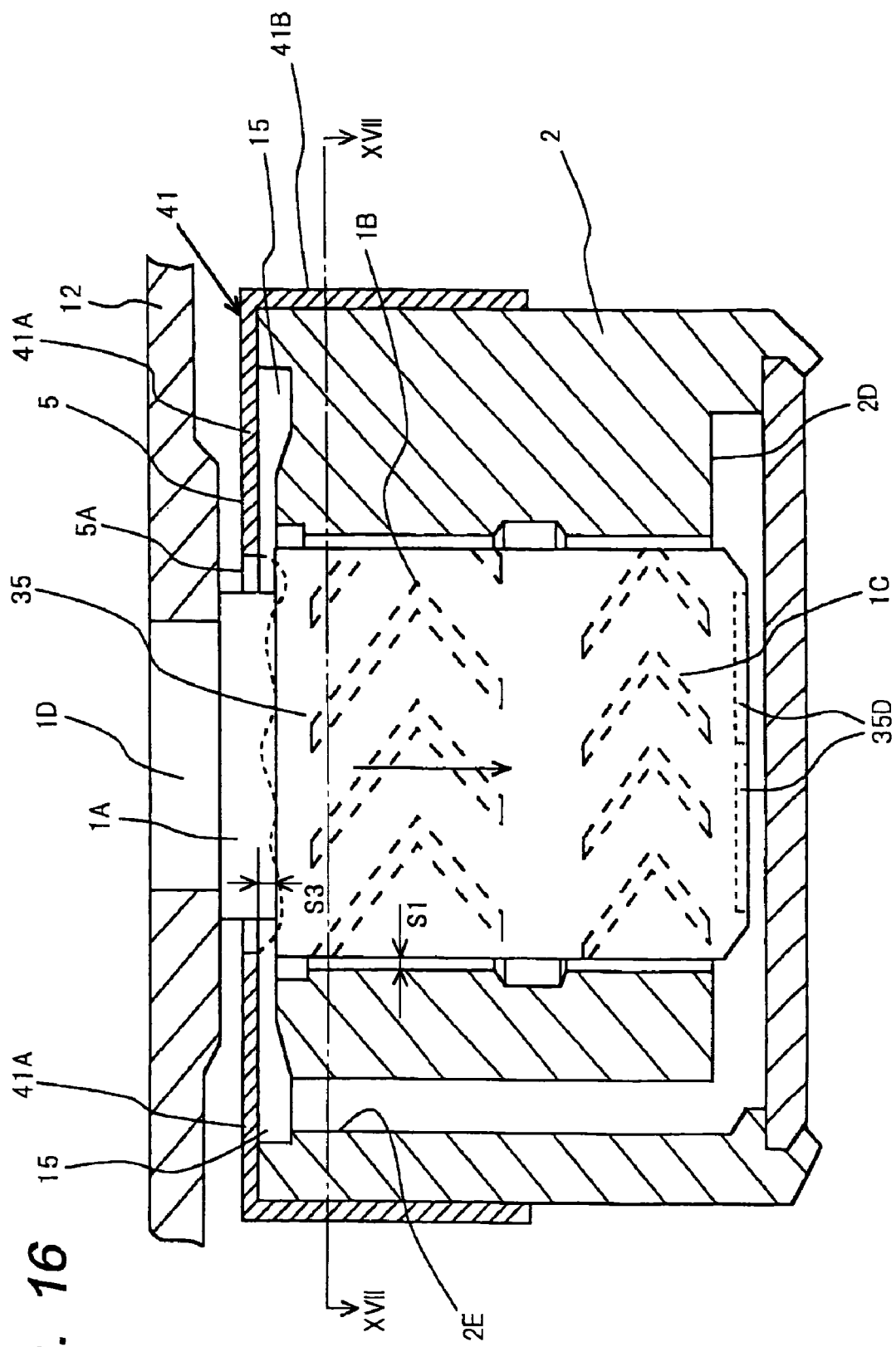
FIG. 16 is a fragmentary sectional view showing a shaft and a sleeve of a hydrodynamic bearing device according to a seventh embodiment of the present invention.
Figure 17:
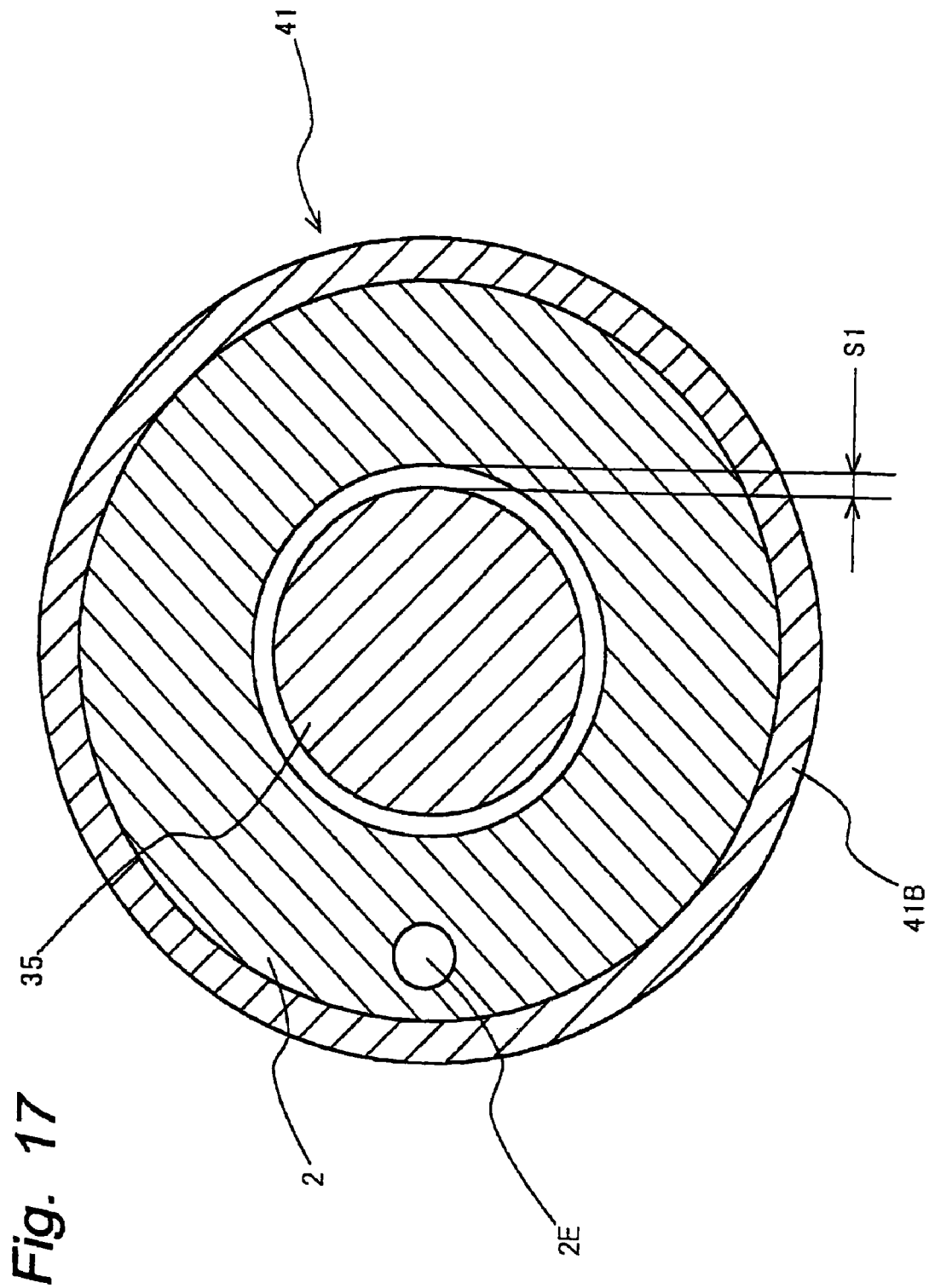
FIG. 17 is a sectional view showing a clearance of a radial bearing of the hydrodynamic bearing device of the seventh embodiment of the present invention.
Figure 18:
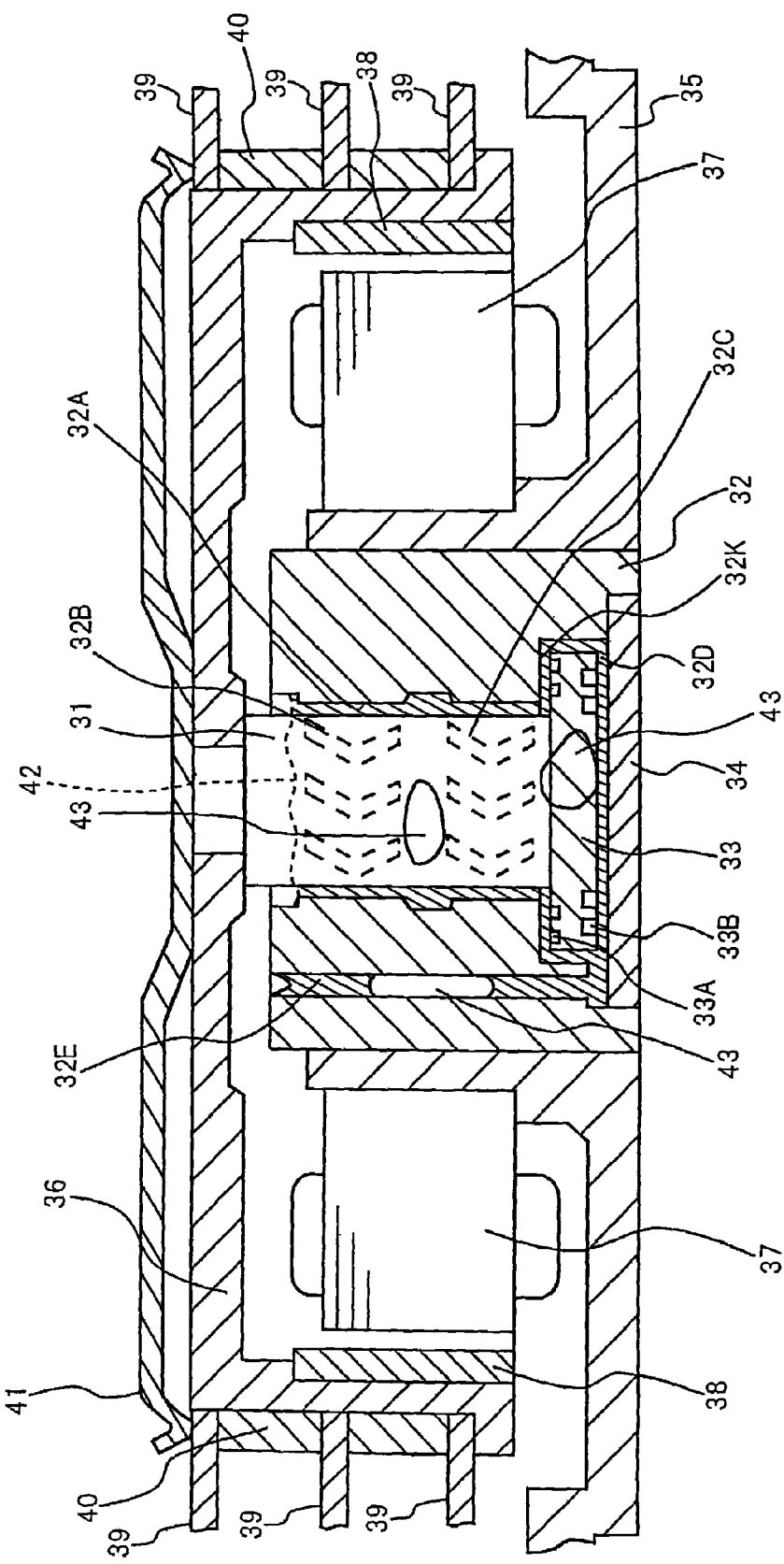
FIG. 18 is a sectional view of a prior art hydrodynamic bearing device.
Figure 19:
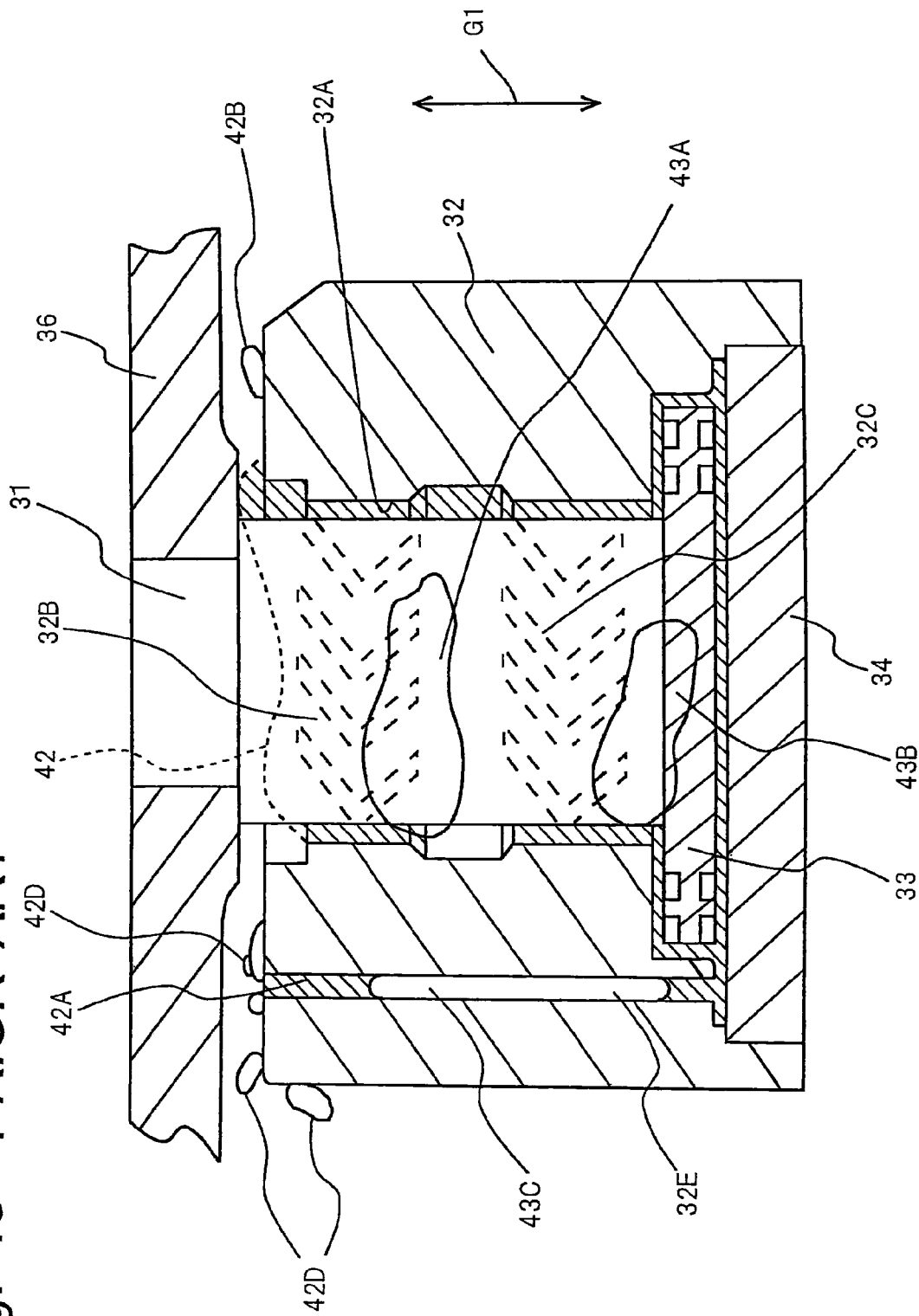
FIG. 19 is a fragmentary sectional view showing a shaft and sleeve of the prior art hydrodynamic bearing device.

FIG. 16 is a fragmentary sectional view showing the shaft 35 and the sleeve 2 of a hydrodynamic bearing device according to a seventh embodiment of the present invention. FIG. 17 is a sectional view along the line XVII-XVII in FIG. 16. In this embodiment, a cover plate 41 is structurally different from that of the sixth embodiment and other constructions are similar to those of the sixth embodiment.

The cover plate 41 of this embodiment has a disklike portion 41A and a cylindrical portion 41B which are formed integrally with each other. An upper portion of the sleeve 2 is desirably press fitted into the cylindrical portion 41B. The sleeve 2 may also be inserted into the cylindrical portion 41B so as to be attached thereto.

In the hydrodynamic bearing devices of the foregoing embodiments, the shaft 35 is formed by an iron-series material having high rigidity. Meanwhile, the sleeve 2 is formed by a copper-series material such as free-cutting brass in which high machining accuracy is obtained easily by its quite excellent machinability. The cover plate 41 is at least made of a material whose coefficient of linear expansion is smaller than that of the sleeve 2. For example, it is desirable that the cover plate 41 is made of an iron-series material having high rigidity in the same manner as the shaft 35.

However, if the shaft 35 and the sleeve 2 of the hydrodynamic bearing device of this embodiment are made of the materials referred to above, the sleeve 2 is expanded due to difference in the coefficients of linear expansion of the respective materials when the hydrodynamic bearing device has reached a high temperature. Consequently, the dimension S1 of the radial clearance between the shaft 35 and the sleeve 2 increases as shown in FIG. 17, thereby possibly resulting in drop of pressure generated by the hydrodynamic bearing device and drop of rigidity of the oil film.

Therefore, in this embodiment, the shaft 35 is formed by an iron-series material such as a ferrite-series or martensite-series stainless steel having a coefficient of linear expansion of $1.03 \times 10^{-5}/°$ C. and the sleeve 2 is formed by a copper alloy having a coefficient of linear expansion of $2.05 \times 10^{-5}/°$ C. Meanwhile, the cover plate 41 is formed by a martensite-series stainless steel having a coefficient of linear expansion of $1.03 \times 10^{-5}/°$ C. If the materials are selected as described above, inside diameter of the cylindrical portion 41B of the cover plate 41 does not increase so much due to small amount of expansion of the cylindrical portion 41B. On the other hand, the sleeve 2 is made of the material having the coefficient of linear expansion larger than that of the cover plate 41. Hence, when temperature rises, amount of expansion of the outside diameter of the sleeve 2 is larger than that of an inside diameter of the cylindrical portion 41B of the cover plate 41. However, since the less expandable cylindrical portion 41B of the cover plate 41 grasps the outside diameter of the sleeve 2, thermal expansion of the outside diameter of the sleeve 2 is restrained by the cylindrical portion 41B of the cover plate 41. Namely, the cylindrical portion 41B of the cover plate 41 is capable of restricting expansion of the inside and outside diameters of the sleeve 2 by applying pressure to the outer periphery of the sleeve 2.

In this embodiment, even at high temperatures, amount of thermal expansion of the inside and outside diameters of the sleeve 2 is small and is not so different from that of the shaft 35. Thus, it can be arranged that the dimension S1 of the radial clearance of the radial bearing does not change greatly upon changes in temperature. As a result, changes of performance of the hydrodynamic bearing device with temperature are restrained. Meanwhile, since the cylindrical portion 41B of the cover plate 41 is fixed to the outer periphery of the sleeve 2, the cover plate 41 is securely mounted on the sleeve 2 and thus, there is no risk that the shaft 35 is detached from the sleeve 2.

In this embodiment, since air mixed into the oil 13 of the hydrodynamic bearing device is readily discharged, absence of the oil film, which is often associated with prior art bearings, is prevented and it is possible to minimize change of the radial clearance between the shaft 35 and the sleeve 2 upon changes in temperature of the hydrodynamic bearing device. Thus, it is possible to materialize the hydrodynamic bearing device operating with high precision for a long service life even in a use environment having changes in temperature. By employing this hydrodynamic bearing device, it is possible to obtain the disk rotating apparatus operating with high precision for a service life.

INDUSTRIAL APPLICABILITY

The present invention is applicable to not only the hydrodynamic bearing device which is highly reliable for a long service life by preventing leakage of the lubricant but the disk rotating apparatus employing this hydrodynamic bearing device.

The invention claimed is:

1. A hydrodynamic bearing device comprising:
a sleeve having a bearing bore into which a shaft is rotatably inserted;
a cover plate which is provided such that a reservoir for storing lubricant and air is defined in the vicinity of one end portion of the bearing bore;
a substantially disklike flange which is secured to one end portion of the shaft and has one face confronting one end face of the sleeve in the vicinity of the other end portion of the bearing bore;
a thrust plate which is provided so as to confront the other face of the flange and seal a region including the one end face of the sleeve; and
at least one communication path extending from the reservoir of the cover plate toward an outer surface of the flange;
wherein first and second dynamic pressure generating grooves of a herringbone pattern are arranged in a direction along an axis of the shaft on at least one of an inner peripheral surface of the bearing bore of the sleeve and an outer peripheral surface of the shaft;
wherein a third dynamic pressure generating groove of a spiral pattern is provided on at least one of opposed faces of the flange and the thrust plate and a fourth dynamic pressure generating groove of a herringbone pattern is provided on at least one of the one face of the flange and the one end face of the sleeve;
wherein clearances between the shaft and the sleeve and between the flange and the thrust plate including the first, second, third and fourth dynamic pressure generating grooves are filled with lubricant;
wherein one of the sleeve and the shaft is mounted on a stationary base and the other of the sleeve and the shaft is mounted on a rotary member; and
wherein when "S1" denotes a dimension of a radial clearance between the shaft and the sleeve at the time the axis of the shaft is held in alignment with a central axis of the bearing bore, "S2" denotes a dimension of a clearance between the shaft and an inner periphery of the cover plate and "S3" denotes a dimension of clearance between an inner peripheral portion of the cover plate and the other end face of the sleeve, and wherein the dimension S1 is made smaller than the dimensions S2 and S3.

2. A hydrodynamic bearing device comprising:
a sleeve having a bearing bore into which a shaft is rotatably inserted;
a cover plate which is provided such that a reservoir for storing lubricant and air is defined in the vicinity of one end portion of the bearing bore;
a substantially disklike flange which is secured to one end portion of the shaft and has one face confronting one end face of the sleeve in the vicinity of the other end portion of the bearing bore;
a thrust plate which is provided so as to confront the other face of the flange and seal a region including the one end face of the sleeve; and
at least one communication path extending from the reservoir of the cover plate toward an outer surface of the flange;
wherein first and second dynamic pressure generating grooves of a herringbone pattern are arranged in a direction along an axis of the shaft on at least one of an inner peripheral surface of the bearing bore of the sleeve and an outer peripheral surface of the shaft;
wherein a third dynamic pressure generating groove of a spiral pattern is provided on at least one of opposed faces of the flange and the thrust plate and a fourth dynamic pressure generating groove of a spiral pattern is provided on at least one of the one face of the flange and the one end face of the sleeve;
wherein clearances between the shaft and the sleeve and between the flange and the thrust plate including the first, second, third and fourth dynamic pressure generating grooves are filled with lubricant;
wherein one of the sleeve and the shaft is mounted on a stationary base and the other of the sleeve and the shaft is mounted on a rotary member; and
wherein when "S1" denotes a dimension of a radial clearance between the shaft and the sleeve at the time the axis of the shaft is held in alignment with a central axis of the bearing bore, "S2" denotes a dimension of a clearance between the shaft and an inner periphery of the cover plate and "S3" denotes a dimension of clearance between an inner peripheral portion of the cover plate and the other end face of the sleeve, and wherein the dimension S1 is made smaller than the dimensions S2 and S3.

3. The hydrodynamic bearing device as claimed in claim 1 or claim 2, wherein when "S4" denotes a dimension of a clearance between an outer peripheral portion of the cover plate and the other end face of the sleeve, and the dimension S3 is made smaller than the dimension S4.

4. A hydrodynamic bearing device comprising:
a shaft which has, at its one end portion, a thrust bearing face perpendicular to an axis of the shaft;
a sleeve having a bearing bore into which the shaft is rotatably inserted;
a cover plate which is provided such that a reservoir for storing lubricant and air is defined in the vicinity of one end portion of the bearing bore;
a thrust plate which is provided so as to seal the other end portion of the bearing bore and confront the thrust bearing face of the shaft; and
at least one communication path for establishing communication between the reservoir and a region of the other end portion of the bearing bore;

wherein first and second dynamic pressure generating grooves of a herringbone pattern are arranged in a direction along the axis of the shaft on at least one of an inner peripheral surface of the bearing bore of the sleeve and an outer peripheral surface of the shaft;

wherein a third dynamic pressure generating groove of a spiral pattern is provided on at least one of the thrust bearing face and one face of the thrust plate confronting the thrust bearing face;

wherein clearances between the shaft and the sleeve and between the thrust bearing face and the thrust plate including the first, second and third dynamic pressure generating grooves are filled with lubricant;

wherein one of the sleeve and the shaft is mounted on a stationary base and the other of the sleeve and the shaft is mounted on a rotary member; and wherein when "S1" denotes a dimension of a radial clearance between the shaft and the sleeve at the time the axis of the shaft held in alignment with a central axis of the bearing bore, "S2" denotes a dimension of a clearance between the shaft and an inner periphery of the cover plate and "S3" denotes a dimension of clearance between an inner peripheral portion of the cover plate and the an end face of the sleeve, and wherein the dimension S1 is made smaller than the dimension S2.

5. The hydrodynamic bearing device as claimed in claim 4, wherein when "S4" denotes a dimension of a clearance between an outer peripheral portion of the cover plate and the end face of the sleeve, the dimension S3 is made smaller than the dimension S4.

6. The hydrodynamic bearing device as claimed in claim 5, wherein when "S6" denotes a dimension of a clearance between an outer periphery of a small diameter portion of the shaft and the inner periphery of the cover plate, the dimension S3 is made smaller than the dimension S6; and Wherein the shaft has, at the other end portion, a small diameter portion having a diameter smaller than that of the shaft, while an inside diameter of the cover plate is larger than the diameter of the small diameter portion and smaller than the diameter of the shaft.

7. The hydrodynamic bearing device as claimed in claims 1, 2 or 4, wherein at least one ventilation port for establishing communication between the reservoir and exterior is formed on the cover plate so as to circumferentially deviate from the communication path.

8. The hydrodynamic bearing device as claimed in claim 7, wherein by bulging one circumferential portion of the cover plate, the ventilation port has a recess on one face of the cover plate adjacent to the reservoir.

9. A disk rotating apparatus including the hydrodynamic bearing device of one of claims 1, 2-8, in which a rotor hub having a rotor magnet is mounted on the other end portion of the shaft and at least one disk for recording and reproduction is mounted on the rotor hub by a damper.

* * * * *

UNITED STATES PATENT AND TRADEMARK OFFICE
CERTIFICATE OF CORRECTION

PATENT NO. : 7,589,934 B2
APPLICATION NO. : 12/188545
DATED : September 15, 2009
INVENTOR(S) : Takafumi Asada et al.

It is certified that error appears in the above-identified patent and that said Letters Patent is hereby corrected as shown below:

In claim 4, col. 17, line 20, "shaft held" should be -- shaft is held --

In claim 4, col. 17, line 25, "and the an" should be -- and an --

In claim 6, col. 18, line 9, "Wherein" should be -- wherein --

In claim 9, col. 18, line 27, "damper" should be -- clamper --

Signed and Sealed this

Eleventh Day of May, 2010

David J. Kappos
*Director of the United States Patent and Trademark Office*